United States Patent [19]

Tanaka

[11] Patent Number: 4,843,296
[45] Date of Patent: Jun. 27, 1989

[54] AC MOTOR DRIVE APPARATUS
[75] Inventor: Shigeru Tanaka, Tokyo, Japan
[73] Assignee: Kabushiki Kaisha Toshiba, Kawasaki, Japan
[21] Appl. No.: 63,230
[22] Filed: Jun. 17, 1987
[30] Foreign Application Priority Data Jun. 23, 1986 [JP] Japan .................................. 61-144911
Jul. 21, 1986 [JP] Japan .................................. 61-171190

[51] Int. Cl.⁴ ............................................ H02P 5/40
[52] U.S. Cl. ..................... 318/800; 318/801; 363/37
[58] Field of Search .......... 318/800; 363/10, 159–163, 363/34–37; 323/207, 210, 211

[56] References Cited
U.S. PATENT DOCUMENTS

| | | | |
|---|---|---|---|
| 3,323,032 | 5/1967 | Agarwal et al. | 318/801 |
| 3,431,483 | 3/1969 | Lafuze | 363/10 |
| 4,327,313 | 4/1982 | Isuboi et al. | 318/808 |
| 4,335,337 | 6/1982 | Okamatsu et al. | 318/52 |
| 4,529,925 | 7/1985 | Tanaka et al. | 363/161 |
| 4,544,873 | 10/1985 | Salihi et al. | 318/801 |

Primary Examiner—David Smith, Jr.
Attorney, Agent, or Firm—Oblon, Fisher, Spivak, McClelland & Maier

[57] ABSTRACT

An apparatus according to this invention includes a DC power source, a DC-AC power converter having an output terminal coupled to the DC power source via a DC reactor, a high-frequency, phase-advanced capacitor coupled to an input terminal of the DC-AC power converter, a circulating current type cycloconverter having an input terminal coupled to the phase-advanced capacitor, and an AC motor coupled to the output terminal of the cycloconverter. In this apparatus, a current supplied from the DC power source is controlled by the DC-AC power converter, so that a crest value of a voltage applied to the phase-advanced capacitor is substantially constant. The cycloconverter controls to supply a sine wave current of a variable frequency (0 to several hundred Hz) to the AC motor.

26 Claims, 12 Drawing Sheets

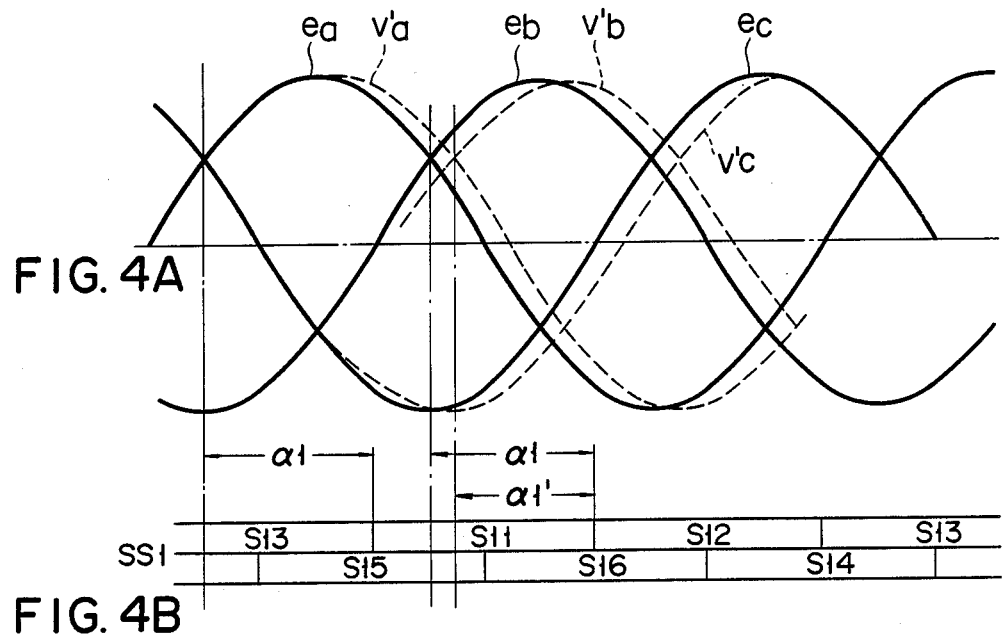
FIG. 4A
FIG. 4B
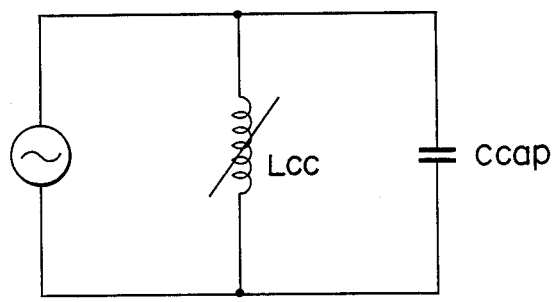
FIG. 5

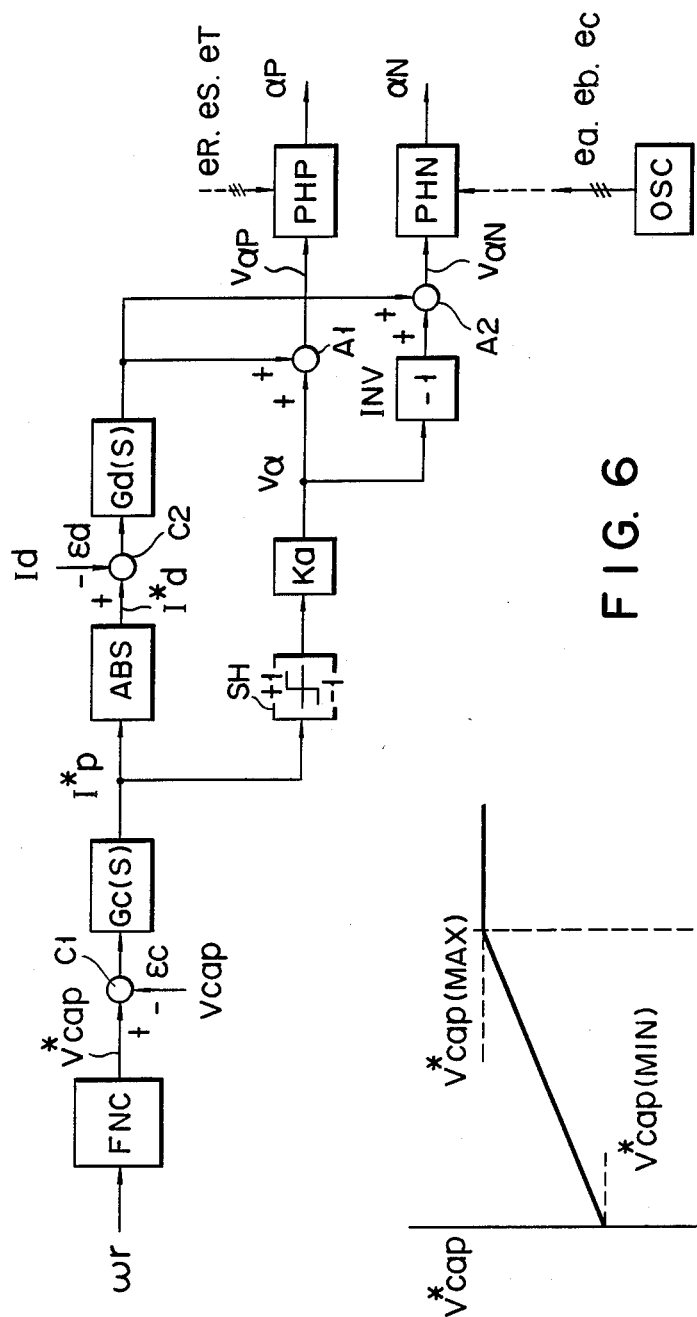
F I G. 6
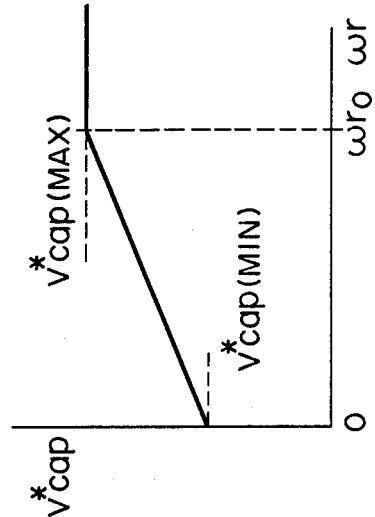
F I G. 7

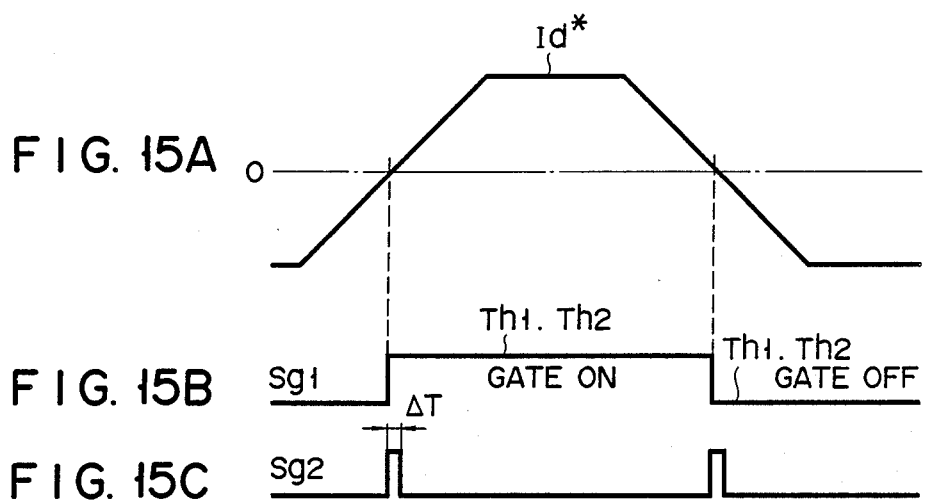
FIG. 15A
FIG. 15B
FIG. 15C
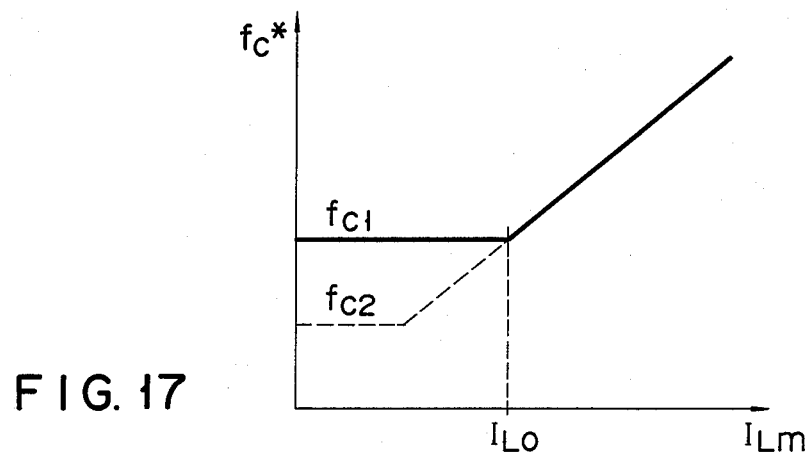
FIG. 17
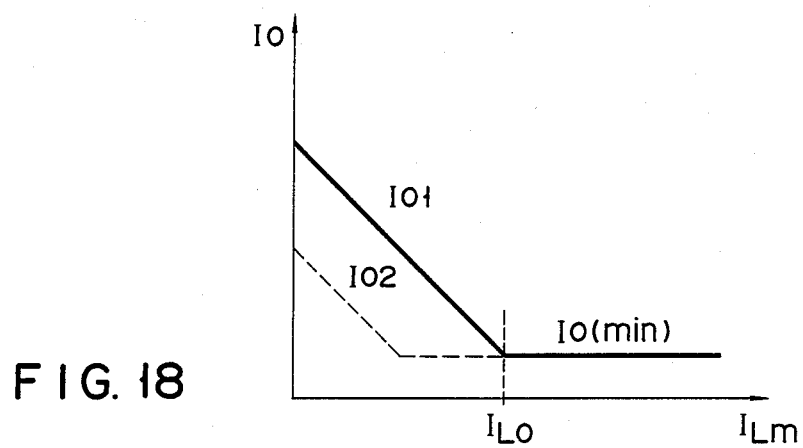
FIG. 18

AC MOTOR DRIVE APPARATUS

BACKGROUND OF THE INVENTION

The present invention relates to a high-speed, large-capacity AC variable speed motor drive apparatus.

Motors can be primarily classified into DC motors and AC motors.

DC motors have small torque ripples and good controllability, and can be easily handled. DC motors have been used in a wide range of applications, in combination with DC chopper (thyristor chopper) devices. However, DC motors require extensive, and therefore time-consuming maintenance work on their brushes and commutators, and there are limitations on their maximum operation speed and/or their maximum capacity. For this reason, in recent years, DC motors have tended to be increasingly replaced by AC variable speed motors.

DC train systems also have the same limitations as outlined above, and drive systems using AC variable speed motors have been used gradually with the aim of high-speed operation and a large capacity.

Typical AC motors include induction motors and synchronous motors. Although AC motors also include reluctance motors and hysteresis motors, these have a considerably narrower range of applications.

A commutatorless motor is known, in which a counter electromotive force of a synchronous motor is used to naturally commutate a thyristor inverter. Since the commutatorless motor utilizes natural commutation, it can easily have a large capacity, has similar controllability to that of DC motors, and can be used in various fields. However, since the commutatorless motor requires a field pole, the overall motor device becomes bulky, and has a small overload strength due to the limitations thus imposed on natural commutation.

An inductance motor, in particular, a squirrelcage induction motor, has a simple and rigid structure, and can be easily handled. However, this motor requires a self-excited inverter, and has certain limitations due to the characteristics of the inverter.

Nowadays, self-extinction elements such as transistors, GTOs, and the like tend to have a large capacity, and are used in the self-excited inverter. In particular, a pulse-width modulation (PWM) controlled inverter can supply a sine wave current to a motor. Therefore, an AC variable speed motor having low noise and a small torque ripple can be realized. Meanwhile, various control techniques have been established for induction motors, such as a V/f=constant control, slip frequency control, vector control, and the like, such control techniques enabling characteristics equivalent to those of DC motors to be obtained.

A cycloconverter is known as a typical example, which utilizes a voltage from an AC power source to effect natural commutation. The cycloconverter can supply a sine wave current to a motor, and its capacity can be easily increased, due to its natural commutation. In particular, as is described in U.S. Pat. No. 4,418,380 (Nov. 29, 1983), U.S. Pat. No. 4,570,214 (Feb. 11 1983), or Japanese Patent Publication No. 59-14988, a reactive-power compensation type cycloconverter, in which an input power factor at a receiving end is controlled to be always 1, has received a great deal of attention.

The above types of AC motor drive techniques have been used in various fields of application, while taking their advantages. However, an apparatus for driving a high-speed, large-capacity motor, applied to DC train systems, cannot easily be realized by use of conventional techniques. More specifically, although the cycloconverter utilizes natural commutation so that its capacity can be easily increased, the output frequency of a cycloconverter is low and not suitable for high-speed operation.

An apparatus for driving an induction motor by means of a self-excited inverter requires large-capacity, self-extinction elements such as transistors, GTOs, and the like. Consequently, the resulting apparatus is expensive, and it is difficult to increase its capacity. An available switching frequency of the large-capacity, self-extinction elements (particularly the GTOs) is at most 1 kHz. If PWM control is applied to such elements, the output frequency of the self-excited inverter is at most 100 Hz.

Since the commutatorless motor utilizes natural commutation, its capacity can be easily increased, and high-speed operation is easy to achieve. However, the motor itself is complicated and bulky. Further, since a rectangular current is supplied to an armature winding, torque ripples produced by the motor are increased. In addition, problems associated with the way of commutation at the beginning of energization and with an insufficient overload strength, still remain.

On the other hand, along with an increase in the capacity of the motor, the influence of reactive power generated from the power source and that of harmonic components of the reactive power cannot be ignored. Variations in reactive power cause variations in the power source system voltage, and adversely influence other electrical equipment connected to the same power source system. A harmonic current induces induction problems in television systems, radio receivers, or communication lines, and harmonic components of the 3rd, 5th, and 7th orders are hard to remove, and therefore require appropriate countermeasures.

In contrast to this, the reactive-power compensation type cycloconverter is an effective means for solving the reactive power problem, and serves as a power converter for maintaining the input power factor of the receiving end always at 1. However, depending on the output frequency, a harmonic current appears at the input side, and countermeasures must be taken thereagainst. However, according to the current technique, the countermeasure is difficult to attain.

Recently, a power converter has been proposed, which has functions of both an AC power converter and an active filter, as disclosed in Japanese Patent Disclosure (Kokai) No. 59-61475. An AC motor drive system constituted by a combination of this power converter and a self-excited inverter has received a great deal of attention.

In the system utilizing the active filter, since an input current is controlled to be a sine wave in the same phase as that of the power source voltage, a harmonic component is small, and the input power factor can always be maintained to be 1. However, the converter must be constituted by self-extinction elements such as transistors and GTOs, and thus, a large-capacity system is difficult to realize and has an economical problem.

SUMMARY OF THE INVENTION

It is accordingly an object of the present invention to provide a high-speed, large-capacity AC variable speed motor drive apparatus which can supply a sine wave current having a frequency of 0 to several hundred Hz to an AC motor.

In order to achieve the above object, the AC variable speed motor drive apparatus according to the present invention comprises a DC-AC power converter having an output terminal connected to a DC power source, a high-frequency, phase-advanced capacitor connected to an input terminal of the DC-AC power converter, and a circulating current type cycloconverter having an input terminal connected to the phase-advanced capacitor. A current supplied from the DC power source is controlled by the DC-AC power converter, so that the crest value of a voltage applied to the phase-advanced capacitor can be made substantially constant. The circulating current type cycloconverter supplies a sine wave current of a variable frequency (0 to several hundred Hz) to an AC motor.

The DC-AC power converter performs power conversion between the DC power source and the phase-advanced capacitor, and controls the current supplied from the DC power source, so that the voltage applied to the phase-advanced capacitor is made substantially constant. The DC-AC power converter is naturally commutated by utilizing an AC voltage applied to the phase-advanced capacitor.

The circulating current type cycloconverter performs power conversion between the phase-advanced capacitor and the AC motor. For example, the cycloconverter can supply a sine wave current of a frequency of 0 to 500 Hz to the armature winding, while the frequency of the voltage of the phase-advanced capacitor is 500 Hz.

At this time, the phase-advanced capacitor serves as an advanced reactive power source for both the DC-AC power converter and the cycloconverter, and its frequency (500 Hz) is determined so that the delayed reactive power of both the DC-AC power converter and the cycloconverter is equal to the advanced reactive power of the phase-advanced capacitor. In other words, when a phase control reference signal is supplied from an external sine wave oscillator (at a frequency of 500 Hz) to the DC-AC power converter and to the cycloconverter, the circulating current of the cycloconverter flows so that the frequency and phase of the reference signal coincide with those of the phase-advanced capacitor voltage.

With the phase-advanced capacitor voltage established in this manner, the DC-AC power converter and the cycloonverter perform power conversion by utilizing only natural commutation, and hence, a high-speed, large-capacity AC motor drive apparatus can be realized.

BRIEF DESCRIPTION OF THE DRAWINGS

FIGS. 4A and 4B are respectively a waveform chart of a phase control reference signal of a cycloconverter, and a mode chart of trigger pulse signal of the embodiment shown in FIG. 1;

FIG. 5 is an equivalent circuit diagram for one phase of the input side of the cycloconverter;

FIG. 6 is a detailed block diagram of a control circuit for first and second power converters (SSP, SSN) of the embodiment shown in FIG. 1;

FIG. 7 is a graph illustrating a characteristic of a voltage reference generator (FNC) shown in FIG. 6;

FIGS. 15A to 15C are waveform charts for explaining the operation of the circuit shown in FIG. 14;

FIGS. 17 and 18 are graphs of external characteristics for explaining the operation of the motor drive apparatus shown in FIG. 13.

DETAILED DESCRIPTION OF THE PREFERRED EMBODIMENTS

The present invention will be described hereinafter with reference to the accompanying drawings.

Figure 1:
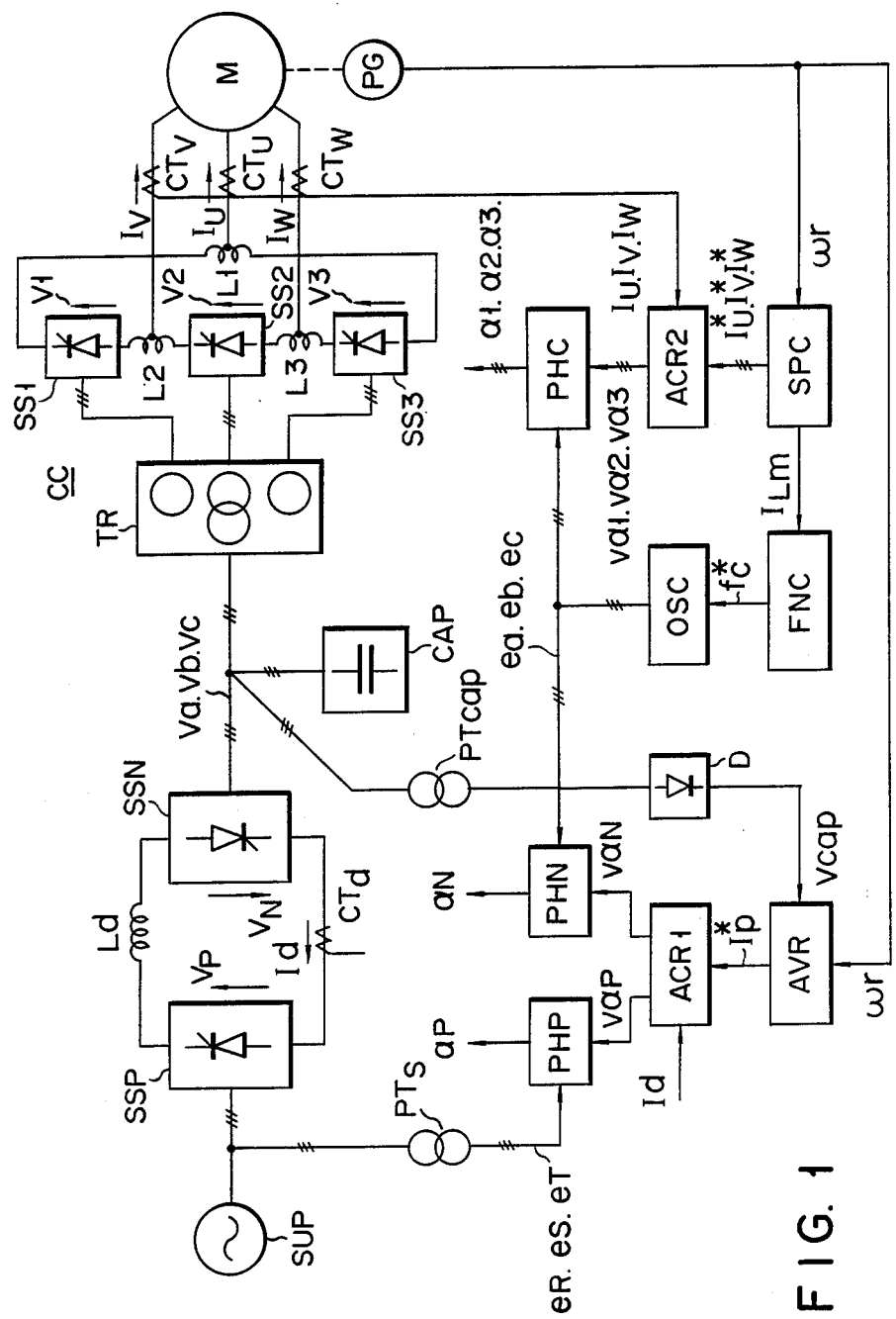
FIG. 1 is a block diagram showing the arrangement of an AC motor drive apparatus according to an embodiment of the present invention.

FIG. 1 is a block diagram of an AC motor drive apparatus according to an embodiment of the present invention. As shown in FIG. 1, and AC power from three-phase AC power source SUP is converted to a direct current by first power converter SSP. The converted DC power is input to second power converter SSN through DC reactor Ld, and is converted to an AC power of a variable frequency. The AC power is supplied to AC motor M through high-frequency phase-advanced capacitor CAP and circulating current type cycloconverter CC.

Cycloconverter CC is constituted by externally-excited converters SS1 to SS3 and DC reactors L1 to L3, and input terminals of the respective converters are insulated by insulating transformer TR.

A control circuit is constituted by current detecting current transformers CTd, CTu, CTv, and CTw, voltage detecting transformers PTs, PTcap, diode D, external oscillator OSC, speed controller SPC, voltage controller AVR, current controllers ACR1 and ACR2, phase controllers PHP, PHN, and PHC, and pulse generator PG for detecting the rotation speed of motor M.

Current detecting transformer CTd detects output current Id of first power converter SSP, and supplies the detected current to current controller ACR1. Current detecting transformers CTu, CTv, and CTw detect output currents Iu, Iv, and Iw in the respective phases of cycloconverter CC, respectively, and supply the detected currents to current controller ACR2. Voltage detecting transformer PTS detects respective phase voltages eR, eS, and eT of three-phase AC power source SUP, and sends the detected voltages to phase controller PHP. Voltage detecting transformer PTcap detects output voltages Va, Vb, and Vc in respective phases of second power converter SSN, and supplies the detected voltages, as voltage crest value Vcap, to voltage controller AVR through diode D. External oscillator OSC generates three-phase reference voltages ea, eb, and ec, and sends them to phase controllers PHN and PHC. The oscillation frequency of oscillator OSC can be controlled by frequency instruction fc* obtained from function generator FNC. (This will be described later with reference to FIGS. 16 and 17.)

Speed controller SPC receives rotation detection signal $\omega r$ from pulse generator PG, and generates current reference signals Iu*, Iv* and Iw* to supply them to current controller ACR2. Current controller ACR2 compares current detection signals Iu, Iv, and Iw with current reference signals Iu*, Iv*, and Iw*, respectively, and generates control voltages $v\alpha 1$, $v\alpha 2$, and $v\alpha 3$ to supply them to phase controller PHC. Phase controller PHC compares control voltages $v\alpha 1$, $v\alpha 2$, and $v\alpha 3$ with reference voltages ea, eb, and ec, respectively, and generates phase signals $\alpha 1$, $\alpha 2$, and $\alpha 3$ for externally-excited converters SS1, SS2, and SS3.

Voltage controller AVR receives rotation detection signal $\omega r$ from pulse generator PG and voltage crest value Vcap from diode D. Then, controller AVR generates reference current Ip*, and sends it to current controller ACR1. Controller ACR1 compares current detection signal Id with reference current Ip*, and generates control voltages $v\alpha P$ and $v\alpha N$ and send them to phase controllers PHP and PHN.

Phase controller PHP compares control voltage $v\alpha P$ with voltage detection signals eR, eS, and eT, and generates phase signal $\alpha P$ for first power converter SSP. Phase controller PHN compares control voltage $v\alpha N$ with reference voltages ea, eb, and ec, and generates phase signal $\alpha N$ for second power converter SSN.

In the above arrangement, first and second power converters SSP and SSN are connected so that current Id flows through DC reactor Ld, and they perform power conversion between AC power source SUP and phase-advanced capacitor CAP serving as a high-frequency reactive power source. More specifically, they constitute a kind of frequency converter, and control the value of DC current Id, such that the crest value of the voltage applied to high-frequency phase-advanced capacitor CAP is substantially made constant.

Circulating current type cycloconverter CC performs power conversion between phase-advanced capacitor CAP, serving as the high-frequency reactive power source, and AC motor M. Cycloconverter CC supplies an AC power of a variable voltage and variable frequency to motor M. Note that a delta-connected cycloconverter is exemplified herein.

Three-phase reference voltages ea, eb, and ec from external oscillator OSC are used for the phase control of both of cycloconverter CC and second power converter SSN, so that frequencies and phases of voltages Va, Vb, and Vc of phase-advanced capacitor CAP coincide with those of reference voltages ea, eb, and ec, respectively.

The operation of the arrangement shown in FIG. 1 will be described in detail.

First, a starting operation for establishing voltages Va, Vb, and Vc of phase-advanced capacitor CAP will be described below.

The input terminal of first power converter SSP is connected to AC power source SUP. Unit sine waves eR, eS, and eT, synchronizing with power source voltages VR, VS, and VT, are used for the phase control. Therefore, output voltage VP, represented by below equation (1), can be generated by adjusting trigger phase angle $\alpha P$.

$$VP = kV \cdot Vsm \cdot \cos\alpha P \qquad (1)$$

where kV is a conversion constant and Vsm is a power source voltage crest value.

Figure 2:
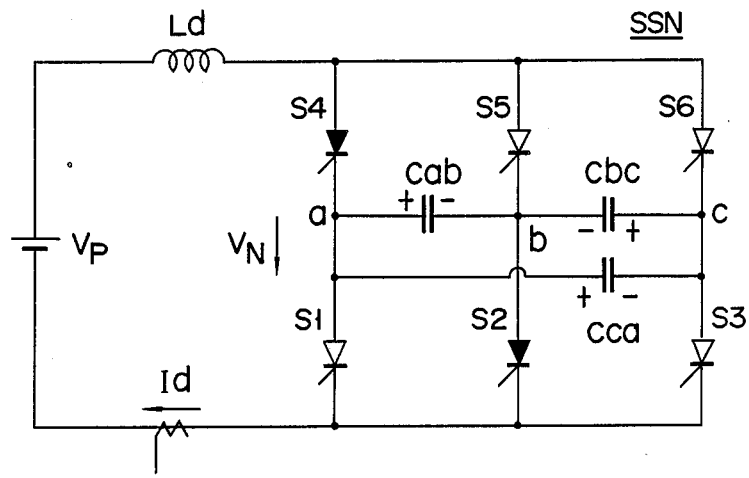
FIG. 2 is an equivalent circuit diagram of the main part (SSN) of the embodiment shown in FIG. 1.

FIG. 2 is an equivalent circuit diagram of second power converter SSN and phase-advanced capacitor CAP (Cab, Cbc, Cca) when first power converter SSP generates positive voltage VP.

Assume that thyristors S2 and S4 receive trigger pulses. Then, charging current Id flows through a passage constituted by power source VP+, DC reactor Ld, thyristor S4, capacitor Cab, thyristor S2, and power source VP−, and through a passage constituted by power source VP+, DC reactor Ld, thyristor S4, capacitor Cca, capacitor Cbc, thyristor S2, and power source VP−. As a result, DC voltage VP is applied to capacitor Cab, and a voltage of −VP/2 is applied to capacitors Cbc and Cca. When trigger pulses are applied to thyristor S3, a reverse bias voltage is applied to thyristor S2 by a voltage charged on capacitor Cbc. Then, thyristor S2 is turned off. Namely, upon starting the operation, phase-advanced capacitor CAP serves as a commutation capacitor. When thyristors S3 and S4 are turned on, a voltage of −VP is applied to capacitor Cca, and a voltage of +VP/2 is applied to capacitors Cab and Cbc.

Figure 3A:
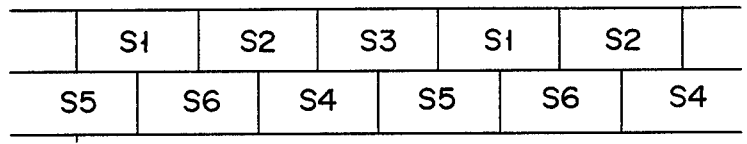
FIGS. 3A to 3C are respectively an ignition mode chart of the thyristors of a second power converter (SSN) and waveform charts of application voltages of a phase-advanced capacitor of the embodiment shown in FIG. 1.
Figure 3B:
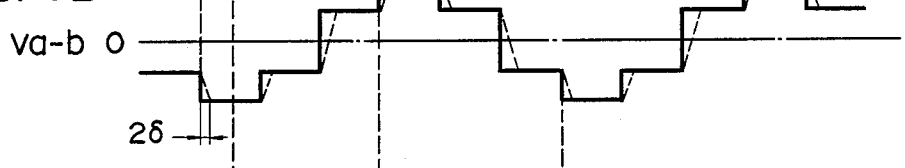
Figure 3C:
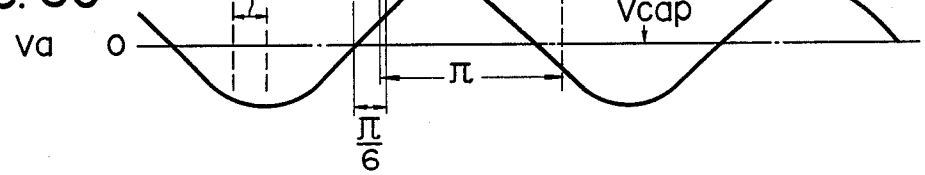

FIG. 3A is a triggering mode chart of thyristors S1 to S6 of second power converter SSN, and FIGS. 3B and 3C are waveform charts of voltages applied to phase-advanced capacitor CAP at that time. Trigger pulses are applied to thyristors S1 to S6 in synchronism with three-phase reference voltages ea, eb, and ec from external oscillator OSC. As a result, voltage Va-b appearing across terminals a and b, shown in FIG. 2, is changed as is shown in FIG. 3B. Since voltage Va-b is charged through reactor Ld, it gradually rises, as indicated by broken curve in FIG. 3B. If the time duration is given as $2\delta$, the fundamental wave component of Va-b is delayed by $\delta$. Here, Va represents the fundamental wave component of a phase voltage and its phase is delayed by $(\pi/6)$ radian from line voltage Va-b.

As can be seen from comparison between phase voltage Va and the triggering mode of thyristors S1 to S6, phase control angle $\alpha N$ upon starting is given as:

$$\alpha N = \pi - \delta \text{ (radian)} \qquad (2)$$

Since $\delta$ is not so large, the motor is approximately driven at $\alpha N = 180$ degrees. Output voltage VN from second power converter SSN at this time is given as:

$$VN = Kc \cdot Vcap \cdot \cos\alpha N \qquad (3)$$

where kc is a conversion constant, and Vcap is a voltage crest value of the capacitor phase voltage.

If $\alpha N \approx 180$ degrees, $VN \approx -kc \cdot Vcap$, and VN is balanced with output voltage VP from first power converter SSP (i.e., $VP = -VN$).

However, in this state, a voltage, higher than DC voltage VP, can no longer be charged by phase-advanced capacitor CAP. Thus, trigger phase angle $\alpha N$ of second power converter SSN is slightly shifted in a 90-degree direction. Inverted value $-VN$ of output voltage VN from second power converter SSN is decreased, and relation $VP > -VN$ is established. As a result, DC current Id is increased to increase capacitor voltage Vcap, and relation $VP = -VN$ is again established to balance the voltages. At this time, Id is zero.

If capacitor voltage Vcap is to be further increased, angle $\alpha N$ is shifted in the 90-degree direction to decrease inverted value $-VN$ of the output voltage, thus achieving the further increase of Vcap. If $\alpha N = 90$ degrees, $-VN = 0$ V. Theoretically, even if DC voltage VP is a very small value, capacitor voltage Vcap can be changed to a large value. However, in practice, power supply must be performed in consideration of circuit loss.

In this manner, voltage Vcap of phase-advanced capacitor CAP can be charged to an arbitrary value.

It will be described below that the frequencies and phases of voltages Va, Vb, and Vc of phase-advanced capacitor CAP, established as described above, respectively coincide with those of phase control reference voltage ea, eb, and ec from external oscillator OSC.

As has been described before, reference voltage ea, eb, and ec are supplied to phase controller PHC of circulating current type cycloconverter CC shown in FIG. 1.

The following description will be made under the assumption that, upon starting, currents Iu, Iv, and Iw supplied from cycloconverter CC to motor M are zero. Therefore, output voltages V1 to V3 from externally-excited converters SS1 to SS3 have the relationship as follows.

$$V1 \approx V2 \approx V3 \approx 0 \qquad (4)$$

Therefore, ignition phase angles $\alpha 1$ to $\alpha 3$ at this time are controlled at about 90 degrees.

FIG. 4A is a waveform chart of phase control reference signals ea, eb, and ec from external oscillator OSC, and FIG. 4B is a mode chart of a trigger pulse signal of externally-excited converter SS1. As shown in FIGS. 4A and 4B, control is made under the condition of $\alpha 1 = 90$ degrees. As for other converters SS2 and SS3, $\alpha 2 \approx \alpha 3 \approx 90$ degrees. Phase control reference signals ea, eb, and ec shown in FIG. 4A can be respectively expressed by:

$$ea = Em \cdot \sin(\omega c \cdot t) \qquad (5)$$

$$eb = Em \cdot \sin(\omega c \cdot t - 2\pi/3) \qquad (6)$$

$$ec = Em \cdot \sin(\omega c \cdot t + 2\pi/3) \qquad (7)$$

where Em is a unit voltage crest value, and $\omega c$ is a high-frequency angular frequency ($= 2\pi fc$).

When the frequencies and phases of phase voltages Va, Vb, and Vc of phase-advanced capacitor CAP coincide with those of the above reference voltages, output voltages V1 to V3 from externally-excited converters SS1 to SS3 can be expressed as follows:

$$V1 = kc' \cdot Vcap \cdot \cos\alpha 1 \qquad (8)$$

$$V2 = kc' \cdot Vcap \cdot \cos\alpha 2 \qquad (9)$$

$$V3 = kc' \cdot Vcap \cdot \cos\alpha 3 \qquad (10)$$

where kc' is a conversion constant.

Therefore, $V1 + V2 + V3 = 0$, and circulating current I0 of cycloconverter CC is not increased.

A case will be considered wherein frequencies of capacitor voltages are decreased to Va', Vb' and Vc' from the above state, as indicated by broken curves in FIG. 4A.

Trigger phase angle $\alpha 1 \approx 90$ degrees of converter SS1 is changed to $\alpha 1' \approx 78$ degrees, so that $V1 > 0$. Similarly, the output voltages from converters SS2 and SS3 are changed to establish $V2 > 0$ and $V3 > 0$, respectively, and $V1 + V2 + V3 > 0$. As a result, circulating current I0 of cycloconverter CC is increased. Circulating current I0 corresponds to a delayed reactive power at the input side of cycloconverter CC with respect to phase-advanced capacitor CAP.

FIG. 5 is an equivalent circuit diagram for one phase of the input side of cycloconverter CC. Cycloconverter CC and second power converter SSN are replaced with variable inductance Lcc providing a delayed current. Resonance frequency fcap of this circuit is expressed by:

$$fcap = 1/(2\pi\sqrt{Lcc \cdot Ccap}) \qquad (11)$$

Since an increase in circulating current I0 corresponds to a decrease in equivalent inductance Lcc, frequency fcap is increased by the increase of I0, and frequencies fcap of Va', Vb', and Vc' come closer to frequency fc. If $fcap > fc$, circulating current I0 is decreased so that, variable inductance Lcc is increased, and they are balanced to yield $fcap = fc$.

If the phase of the voltage from phase-advanced capacitor CAP is delayed from that of the reference voltage, circulating current I0 is increased as in the case wherein $fcap < fc$, and the voltage phase of phase-advanced capacitor CAP is advanced. On the contrary, if the voltage phase of phase-advanced capacitor CAP is advanced from that of the reference voltage, circulating current I0 is decreased as in the case wherein $fcap > fc$, and the voltage phase of phase-advanced capacitor CAP is delayed.

In this manner, circulating current I0 of cycloconverter CC is automatically adjusted so that frequencies and phases of voltages Va, Vb, and Vc of phase-advanced capacitor CAP coincide with those of reference voltages ea, eb, and ec, respectively. This is also established when cycloconverter CC supplies currents Iu, Iv, and Iw to motor M. Note that voltages Va, Vb, and Vc of phase-advanced capacitor CAP can be expressed by the following equations (12), (13) and (14), respectively:

$$Va = Vcap \cdot \sin(\omega c \cdot t) \qquad (12)$$

$$Vb{32} Vcap \cdot \sin(\omega c \cdot t - 2\pi/3) \qquad (13)$$

$$Vc = Vcap \cdot \sin(\omega c \cdot t + 2\pi/3) \qquad (14)$$

where Vcap is a voltage crest value.

Referring again to FIG. 1, control operations for respective parts in a steady mode will be described.

FIG. 6 shows in detail a control circuit for first and second power converters SSP and SSN, and may correspond to the control circuit shown in FIG. 1, as follows.

Voltage controller AVR is constituted by reference voltage generator FNC, comparator C1, and voltage control compensation circuit Gc(S).

Current controller ACR1 is constituted by absolute value circuit ABS, comparator C2, current control compensation circuit Gd(S), Schmitt circuit SH, linear amplifier Kα, inverter INV, and adders A1 and A2.

FIG. 7 is a graph showing the characteristics of reference voltage generator FNC. Voltage instruction Vcap* is changed in accordance with rotation speed ωr of AC motor M. Voltage instruction Vcap* is input to comparator C1.

Voltages of phase-advanced capacitor CAP are detected by transformer PTcap, and the three-phase voltages are rectified by diode D. Thus, voltage crest value Vcap of phase-advanced capacitor CAP is detected, and is input to comparator C1.

Comparator C1 compares voltage instruction Vcap* with detected voltage Vcap and supplies deviation εc (=Vcap*−Vcap) to voltage control compensation circuit Gc(S). Voltage control circuit Gc(S) normally consists of integral components or linear components. In this case, however, for the sake of simplicity, a case of linear amplification will be exemplified (Gc(S)=Kc).

Output Ip* from control compensation circuit Gc(S) is converted to DC current instruction Id* through absolute value circuit ABS. More specifically, Id*=|Ip*|.

D.C current Id is detected by current transformer CTd, and is compared with current instruction Id* by comparator C2. Deviation εd=(Id*−Id) is input to current control compensation circuit Gd(S), and is linearly or integrally amplified thereby. Here, a case of linear amplification of Gd(S)=Kd will be exemplified below. An output signal from current control compensation circuit Gd(S) is input to phase controllers PHP and PHN through adders A1 and A2.

Output signal Ip* from compensation circuit Gc(S) is converted to a "+1" or "−1" of digital signal through Schmitt circuit SH. More specifically, if Ip*>0, output from SH is "+1"
if Ip*<0, output from SH is "−1"

An output signal from Schmitt circuit SH is multiplied with constant Kα through linear amplification, and is converted to phase control input voltage vα. Phase control input voltage vα is input, as control voltage vαP, to phase controller PHP of first power converter SSP through adder A1. Voltage vα is inverted by inverter INV and thereafter, is input, as control voltage vαN, to phase controller PHN of second power converter SSN through adder A2. More specifically, vαP and vαN are expressed by equations (15) and (16):

$$v\alpha P = v\alpha + \epsilon d \cdot Kd \quad (15)$$

$$v\alpha N = -v\alpha + \epsilon d \cdot Kd \quad (16)$$

Output voltages VP and VN from the first and second power converters are proportional to phase control input voltages vαP and vαN.

If Id*=Id, deviation εd is zero, and vαP=vα, and vαN=−vα. Therefore, the output voltages from first and second power converters SSP and SSN are balanced as follows:

$$VP = -VN \propto v\alpha \quad (17)$$

If id*>Id, deviation εd becomes positive so that VP>−VN is obtained to increase DC current Id. Finally, they are balanced to yield Id≈Id*.

Contrarily, if Id*<Id, deviation εd becomes negative so that VP<−VN is obtained to decrease DC current Id. Therefore, the current is controlled to yield Id≈Id*.

In this manner, DC current Id is controlled to coincide with instruction Id*.

Voltage crest value Vcap of phase-advanced capacitor CAP is controlled as follows.

If Vcap*>Vcap, deviation εc becomes positive and output signal Ip* from voltage control compensation circuit Gc(S) becomes positive and is increased. Therefore, the output from Schmitt circuit SH becomes "+1", and vα is given by a positive value. Then, DC current instruction Id* is increased and causes actual DC current Id to increase.

As a result, active power Pd=VP·Id*>0 is supplied to phase-advanced capacitor CAP, and energy given by:

$$Pd \cdot t = (\tfrac{1}{2}) \cdot Ccap \cdot Vcap^2 \quad (18)$$

is accumulated in phase-advanced capacitor CAP. Thus, crest value Vcap of a voltage applied to capacitor CAP is increased and is controlled to yield Vcap≈Vcap*.

In contrast to this, if Vcap*<Vcap, deviation εc becomes negative so that this εc causes output signal Ip* from circuit Gc(S) to be negative. For this reason, the output from Schmitt circuit SH becomes "−1", and vα becomes a negative value. Then, active power Pd is regenerated to three-phase AC power source SUP. Therefore, voltage crest value Vcap of phase-advanced capacitor CAP is decreased, and is balanced to yield Vcap≈Vcap*.

In this manner, by means of first and second power converters SSP and SSN, crest value Vcap of a voltage applied to phase-advanced capacitor CAP is controlled to coincide with instruction Vcap*.

When voltage instruction Vcap* is changed in accordance with rotation speed ωr of AC motor M, as shown in the graph of FIG. 7, voltage crest value Vcap is controlled accordingly, as a matter of course. An effect of changing Vcap is response to ωr will be described later.

The control operation for cycloconverter CC will now be described.

Figures 8, 9:
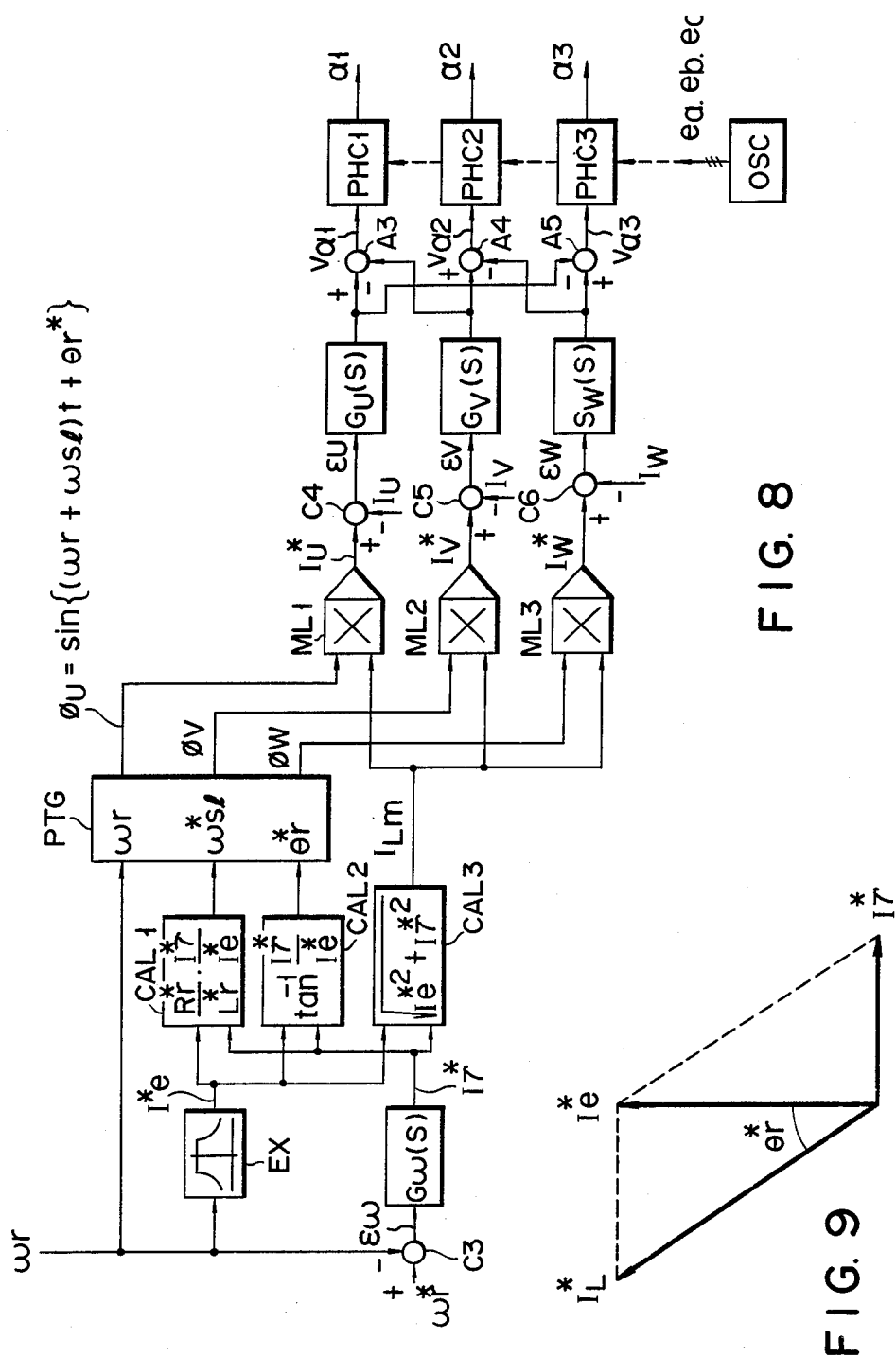
FIG. 8 is a block diagram of a control circuit for the cycloconverter (CC)
FIG. 9 shows current vectors of an induction motor.

FIG. 8 is a block diagram showing a control circuit for cycloconverter CC shown in FIG. 1. This arrangement can correspond to the control circuit shown in FIG. 1 as follows.

Speed controller SPC is constituted by comparator C3, speed control compensation circuit Gω(S), excitation current setting device EX, calculation circuits CAL1 to CAL3, three-phase sine pattern generator PTG, and multipliers ML1 to ML3.

Current controller ACR2 is constituted by comparators C4 to C6, current control compensation circuits Gu(S), Gv(S), and Gw(S), and adders A3 to A5.

Phase controller PHC is constituted by phase controllers PHC1 to PHC3.

A control operation for currents Iu, Iv, and Iw supplied to AC motor (induction motor in this case) M, as well as a speed control operation, will now be described with reference to FIGS. 1 and 8.

A vector-controlled induction motor is known wherein a vector component of secondary current Iτ of the induction motor is determined to be perpendicular to that of excitation current Ie, so that they can be controlled independently. In the following description, a motor of this type that employs this vector control scheme to perform speed control will be exemplified.

A pulse string, being proportional to rotation speed $\omega r$, is derived from pulse generator PG directly coupled to a rotor of the motor.

Comparator C3 compares rotation speed $\omega r$ with its instruction $\omega r^*$, and inputs deviation $\epsilon\omega$ ($=\omega r^* - \omega r$) to speed control compensation circuit $G\omega(S)$. Circuit $G\omega(S)$ comprises linear components or integral components, and supplies torque current instruction $I\tau^*$ as its output.

Rotation speed detection value $\omega r$ is input to excitation current setting device EX and is converted to excitation current instruction Ie*.

Torque current instruction $I\tau^*$ and excitation current instruction Ie* obtained in this manner are input to caclulation circuits CAL1 and CAL2, and are subjected to given calculations.

More specifically, calculation circuit CAL1 performs the following calculation to obtain slip angle frequency $\omega sl^*$.

$$\omega sl^* = (Rr^*/Lr^*)\cdot(I\tau^*/Ie^*) \quad (19)$$

where Rr* indicates a secondary resistance of the motor, and Lr* indicates a secondary inductance thereof.

Calculation circuit CAL2 performs the following calculation to obtain phase angle $\theta r^*$ of primary current instruction IL* with respect to excitation current instruction Ie*:

$$\theta r^* = \tan^{-1}(I\tau^*/Ie^*) \quad (20)$$

Calculation circuit CAL3 performs the following calculation to obtain crest value ILm of primary current instruction IL*:

$$ILm = \sqrt{Ie^2 + I\tau^{*2}} \quad (21)$$

FIG. 9 is a current vector chart of the induction motor. Excitation current Ie* and secondary current (torque current) $I\tau^*$ have the orthogonal relationship therebetween, and generation torque Te from the motor can be expressed by the following equation:

$$Te = Ke \cdot I\tau^* \cdot Ie^* \quad (22)$$

Normally, excitation current instruction Ie* is set to be constant, and generation torque Te of the motor can be controlled by changing secondary current instruction (torque current instruction) $I\tau^*$.

When the motor is driven at a rotation speed exceeding a rated value, field-weakening control is performed such that excitation current instruction Ie* is changed by excitation current setting device EX in accordance with rotation speed $\omega r$.

Slip angular frequency $\omega sl^*$, phase angle $\theta r^*$, and rotation angular frequency (rotation speed detection value) $\omega r$ obtained described above are input to sine pattern generator PTG, thus obtaining three-phase unit sine waves $\phi u$, $\phi v$, and $\phi w$.

$$\phi u = \sin\{(\omega r + \omega sl^*)\cdot t + \theta r^*\} \quad (23)$$

$$\phi v = \sin\{(\omega r + \omega sl^*)\cdot t + \theta r^* - 2\pi/3\} \quad (24)$$

$$\phi w = \sin\{(\omega r + \omega sl^*)\cdot t + \theta r^* + 2\pi/3\} \quad (25)$$

Unit sine waves $\phi u$, $\phi v$, and $\phi w$ determine the frequency and phase of primary current IL supplied to induction motor M.

These three-phase unit sine waves $\phi u$, $\phi v$, and $\phi w$ are multiplied with crest value instruction ILm by multipliers ML1 to ML3, thereby obtaining instructions Iu*, Iv*, and Iw* of three-phase current (primary current) supplied to induction motor M.

$$Iu^* = ILm\cdot\sin\{(\omega r + \omega sl^*)\cdot t + \theta r^*\} \quad (26)$$

$$Iv^* = ILm\cdot\sin\{(\omega r + \omega sl^*)\cdot t + \theta r^* - 2\pi/3\} \quad (27)$$

$$Iw^* = ILm\cdot\sin\{(\omega r + \omega sl^*)\cdot t + \theta r^* + 2\pi/3\} \quad (28)$$

The characteristic feature of vector control of the induction motor lies in that excitation current Ie and secondary current $I\tau$ can be independently controlled. Therefore, when secondary current $I\tau$ is changed while maintaining excitation current Ie of the motor to be constant, the generation torque can be controlled. Then, a speed control response, substantially equivalent to that of a DC motor, can be achieved.

An operation for controlling actual currents Iu, Iv, and Iw in accordance with primary current instructions Iu*, Iv*, and Iw* given as described above, will now be described.

Currents Iu, Iv, and Iw supplied to AC motor M are detected by current transformers CTu, CTv, and CTw shown in FIG. 1.

If output currents from externally-excited converters SS1 to SS3 are given as I1 to I3, equations (29), (30), and (31) are established between themselves and currents Iu, Iv, and Iw supplied to AC motor M:

$$Iu = I1 - I3 \quad (29)$$

$$Iv = I2 - I1 \quad (30)$$

$$Iw = I3 - I2 \quad (31)$$

Primary current detection values Iu, Iv, and Iw of the motor are respectively input to comparators C4 to C6 and are compared with instruction Iu*, Iv*, and Iw*, respectively.

This control operation will be explained below with reference to a U-phase current.

Actual current Iu and instruction Iu* are compared by comparator C4, and deviation $\epsilon u$ ($=Iu^* - Iu$) is input to current control compensation circuit Gu(S). Circuit Gu(S) performs integral or linear amplification, and inputs its output to phase controller PHC1 through adder A3. An inverted value of an output from current control compensation circuit Gu(S) is input to PHC3 through adder A5.

Output voltages V1 to V3 from converters SS1 to SS3 are proportional to input voltages $v\alpha 1$ to $v\alpha 3$ of phase controllers PHC1 to PHC3.

Therefore, if Iu*>Iu is established, deviation $\epsilon u$ becomes positive. Then, input voltage $v\alpha 1$ of phase controller PHC1 is increased through control compensation circuit Gu(S), and output voltage V1 from converter SS1 is also increased in a direction indicated by an arrow in FIG. 1. At the same time, deviation $\epsilon u$ causes input voltage $v\alpha 3$ of phase controller PHC3 to decrease, and causes converter SS3 to generate output voltage V3 in a direction opposite to the arrow in FIG. 1. As a result, output current I1 from converter SS1 is increased, and output current I3 from converter SS3 is decreased. More specifically, U-phase current Iu of the motor represented by equation (29) is increased, and is controlled to establish Iu≈Iu*.

In contrast to this, if Iu*<Iu is established, deviation εu becomes negative, so that output voltage V1 is decreased while V3 is increased. Therefore, Iu (=I1−I3) is decreased, and hence, is controlled to establish Iu≈Iu*. If instruction Iu* is changed along a sine curve, actual current is also controlled to have Iu≈Iu* accordingly, and a sine current can be supplied to induction motor M.

V-phase current Iv and W-phase current Iw are similarly controlled.

Therefore, rotation speed ωr of AC motor M is controlled as follows.

If ωr*>ωr, deviation εω becomes positive, and causes torque current (secondary current) instruction Iτ* to increase through control compensation circuit Gω(S).

As a result, primary current instruction Il* (Iu*, Iv*, Iw*) of the induction motor shown in FIG. 9 causes crest value ILm and phase angle θr* to increase, and actual currents Iu, Iv, and Iw are controlled to be increased accordingly.

Therefore, actual secondary current Iτ of induction motor M is increased to increase generation torque Te, thereby accelerating the motor. Thus, ωr is increased, and is controlled to establish ωr≈ωr*.

Contrarily, if ωr*<ωr, deviation εω becomes negative, and torque current instruction Iτ* is decreased, so that crest value ILm and phase angle θr* of primary current instruction IL* (Iu*, Iv*, Iw*) are decreased. Therefore, generation torque Te is decreased, and rotation speed ωr is decreased to be controlled so as to establish ωr≈ωr*.

In this manner, rotation speed ωr of AC motor M is controlled to coincide with instruction ωr*. Voltage crest value Vcap of phase-advanced capacitor CAP is preferably changed in accordance with the value of rotation speed ωr, as shown in FIG. 7.

Crest values VLm of terminal voltages Vu, Vv, and Vw of AC motor M are increased in proportion to rotation speed ωr. Therefore, voltage crest value Vcap(MAX) of phase-advanced capacitor CAP must be prepared so as to generate voltage crest value VLm(MAX) in the case of maximum rotation speed ωr(MAX). However, as rotation speed ωr is lowered, voltage crest value VLm is also decreased, and hence, voltage crest value Vcap of phase-advanced capacitor CAP can be a small value.

In the low-speed state, the motor can be driven while maintaining voltage crest value Vcap(MAX) at constant. However, a phase-delayed reactive power of cycloconverter CC or second power converter SSN, or a phase-advanced reactive power of phase-advanced capacitor CAP, is increased by an increase in voltage Vcap, and this results in a large loss and an inefficient operation.

For this reason, voltage crest value instruction Vcap* of phase-advanced capacitor CAP is changed in accordance with rotation speed ωr or with instruction ωr* of AC motor M, as shown in FIG. 7.

When ωr=0, voltage crest value Vcap is set to be minimum value Vcap(MIN), and thereafter, is increased up to rated rotation speed ωr0 in proportion to ωr. On the other hand, if the motor is to be operated under the condition of ωr>ωr0, AC motor M is subjected to field-weakening control, and voltage crest value Vcap of phase-advanced capacitor CAP is maintained to be constant at Vcap(MAX).

In this manner, voltage crest value Vcap of phase-advanced capacitor CAP is changed in accordance with rotation speed ωr of AC motor M, so that a loss in the low-speed state can be reduced, and a high-efficient operation can be performed.

If voltage crest value Vcap of phase-advanced capacitor CAP is decreased, absolute value |VN| of output voltage VN from second power converter SSN is decreased. For this reason, the operation of the control circuit shown in FIG. 6 is changed as follows.

If Ip*>0, VP>−VN is established, DC current Id is increased, and then, Id>Id*. For this reason, deviation εd=Id*−Id becomes negative, so that VαP, expressed by equations (15) and (16), is decreased and −v N is increased. As a result, the voltages are balanced so as to establish VP≈−VN>0. At this time, VαP<−VαN.

In contrast to this, if Ip*<0, vα<0, VN becomes positive and VP becomes negative. However, since the absolute value of VN is small, VN<−VP is obtained so that DC current Id is decreased. Therefore, Id<Id* is established, and deviation εd is increased to a positive value. Then, −vαP is decreased, and vαN is increased. Finally, these voltages are balanced so as to establish Id≈Id*, when VN≈−VP<0. At this time, VαN>−VαP.

More specifically, in the low-speed state, the motor is driven while the absolute value of output voltage VP of first power converter SSP is decreased by a drop in Vcap.

Figure 10:
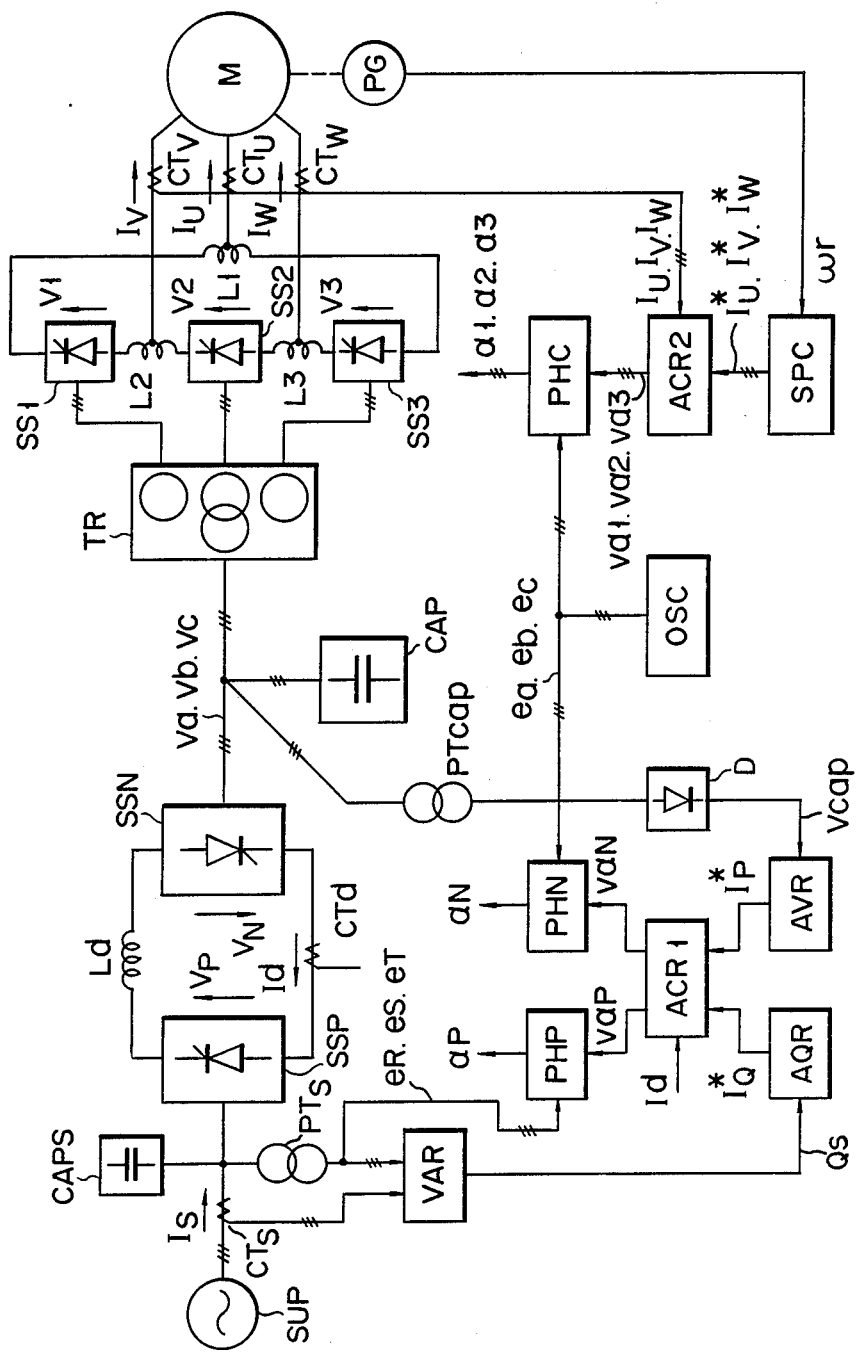
FIG. 10 is a block diagram showing the arrangement of an AC motor drive apparatus according to a second embodiment of the present invention.

FIG. 10 is a block diagram showing another embodiment of the present invention. A difference between the arrangement shown in FIG. 1 and that shown in FIG. 10 is that low-frequency, phase-advanced capacitor CAPS is arranged at the input side of first AC-DC power converter SSP, and reactive power calculation circuit VAR and reactive power controller AQR are provided. As shown in FIG. 10, reactive power calculation circuit VAR receives a detection value of power source current Is from power source current transformer CTs, and phase voltages eR, eS, and eT of AC power source SUP from potential transformers PTs. Then, VAR supplies calculated reactive power Qs to reactive power controller AQR. Controller AQR generates reactive current instruction IQ*, and sends it to current controller ACR1.

Figure 11:
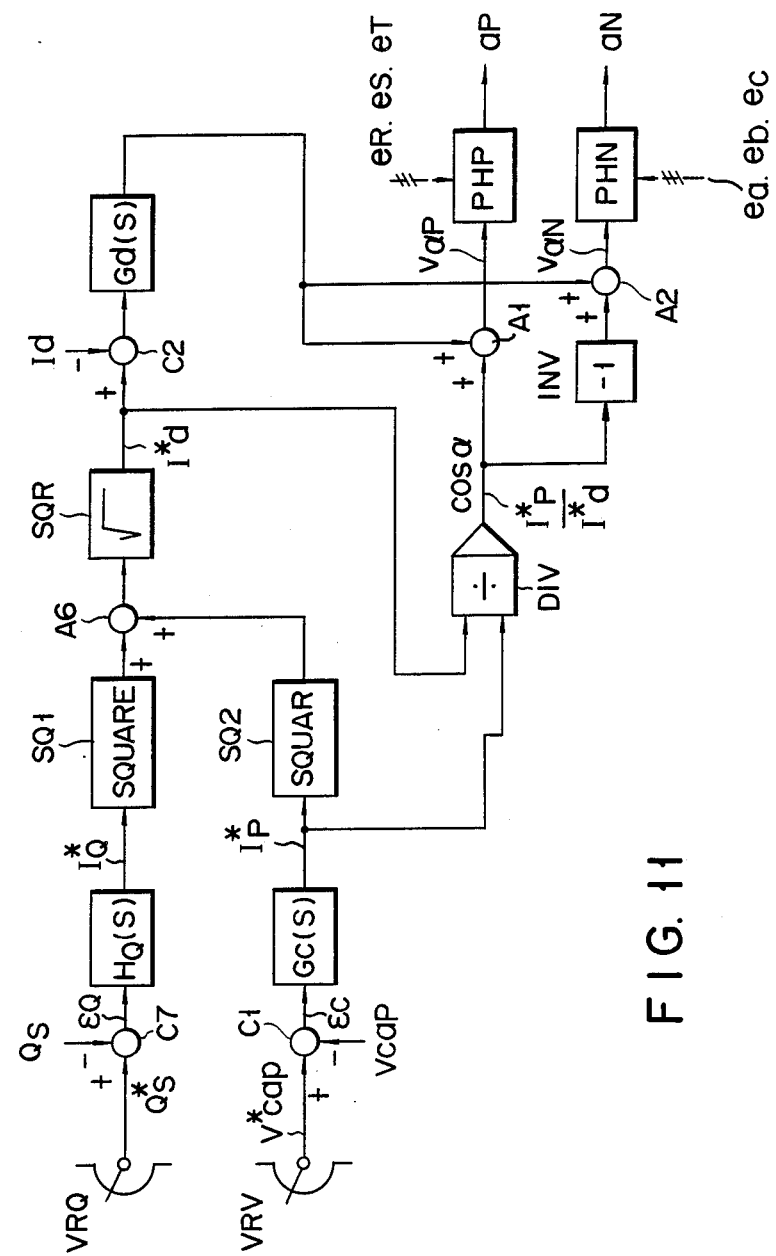
FIG. 11 is a detailed block diagram of a control circuit for first and second power converters (SSP, SSN) shown in FIG. 10.

A control circuit for first and second power converters shown in FIG. 10 is shown in a block diagram in FIG. 11. The respective components in FIG. 10 can correspond to those in FIG. 11, as follows.

Reactive power controller AQR comprises reactive power setting device VRQ, comparator C7, and reactive power control compensation circuit HQ(S). Current controller ACR1 comprises square calculation circuits SQ1 and SQ2, square root caclulation circuit SQR, divider DIV, comparator C2, current control compensation circuit Gd(S), inverter INV, and adders A1, A2, and A6.

An operation of first and second power converters SSP and SSN shown in FIG. 10 will be described below with reference to FIG. 11.

Transformer PTcap shown in FIG. 10 detects three-phase voltages of phase-advanced capacitor CAP, and detects its crest value Vcap through diode D. Comparator C1 compares voltage detection value Vcap with voltage instruction Vcap*, and supplies deviation εc (=Vcap*−Vcap) to voltage control compensation circuit Gc(S). Circuit Gc(S) is conventionally constituted by integral or linear components. In this embodiment, a linear amplifier having only an amplification constant of Gc(S)=Kc will be exemplified. Output Ip* from circuit Gc(S) serves as an active current instruction.

Transformer CTs detects three-phase input currents Is from AC power source SUP, and transformer PTs detects three-phase power source voltages Vs. The three-phase voltage and current detection values are input to reactive power calculation circuit VAR to obtain reactive power Qs at a receiving end. More specifically, three-phase voltages Vs are phase-shifted by 90 degrees, and the phase-shifted voltages are respectively multiplied with input currents Is. Then, the products are added to obtain reactive power detection value Qs.

Reactive power detection value Qs is input to comparator C7, and is compared with instruction Qs* from reactive power setting device VRQ. Deviation $\epsilon Q$ (=Qs*−Qs) is input to reactive power control compensation circuit HQ(S) to be integrally or linearly amplified. Note that output IQ* from circuit HQ(S) serves as a reactive current instruction.

Based on active current instruction Ip* and reactive current instruction IQ*, calculation of equation (32) is made by square calculation circuits SQ1 and SQ2, adder A7, and square root calculation circuit SQR, to thereby obtaining DC current instruction Id:

$$Id^* = \sqrt{Ip^{*2} + IQ^{*2}} \qquad (32)$$

DC current instruction Id and active current instruction Ip* are input to divider DIV, and phase control input voltage $v\alpha$ is obtained based on the calculation of equation (33):

$$v\alpha = \cos\alpha = Ip^*/Id^* \qquad (33)$$

Phase control input voltage $v\alpha$ is input to phase controller PHP of first power converter SSP through adder A1, and an inverted value of $v\alpha$ is input to phase controller PHN of second power converter SSN through adder A2. As phase control reference voltages eR, eS, and eT for phase controller PHP, unit sine waves, being synchronized with power source voltages VR, VS, and VT, are used, and as phase control reference voltages ea, eb, and ec for phase controller PHN, output voltages from external oscillator OSC are used, as in the arrangement shown in FIG. 1.

DC current instruction Id* is compared with DC current detection value Id by comparator C2, and deviation $\epsilon d$ (=Id*−Id) is input to current control compensation circuit $G_d(S)$. Therefore, DC current Id is controlled to coincide with its instruction Id*.

Figure 12:
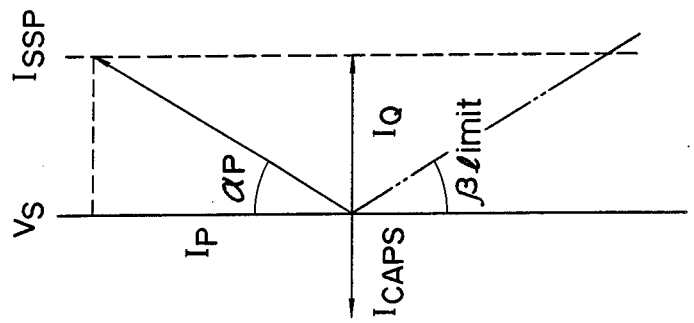
FIG. 12 shows voltage and current vectors for one phase of a receiving end of the first power converter (SSP)

FIG. 12 is a chart showing vector components of a voltage and a current for one phase at the receiving end of power converter SSP. In FIG. 12, reference symbol Vs denotes a power source voltage; ISSP, an input current to first AC-DC power converter SSP; Ip, an active component of ISSP; IQ, a reactive component of ISSP; ICAPS, an advanced current flowing through low-frequency, phase-advanced capacitor CAPS; and $\alpha p$, an ignition phase angle of SSP.

The magnitude of ISSP is proportional to a value of DC current Id, and is expressed as follows when a conversion constant is given as kI:

$$ISSP = kI \cdot Id \qquad (34)$$

Active component Ip and reactive component IQ of ISSP can be respectively expressed as:

$$Ip = ISSP \cdot \cos\alpha p \qquad (35)$$

$$IQ = ISSP \cdot \sin\alpha p \qquad (36)$$

On the other hand, in the control circuit shown in FIG. 11, DC current instruction Id* and trigger phase angle $\alpha$ (=$\alpha p$) are given by equations (32) and (33), respectively. If control is made to yield Id=Id*, equations (34) to (36) can be rewritten as follows:

$$ISSP = kI \cdot Id^* = kI\sqrt{Ip^{*2} + IQ^{*2}} \qquad (37)$$

$$Ip = ISSP \cdot (Ip^*/Id^*) = kI \cdot Ip^* \qquad (38)$$

$$IQ = ISSP \cdot (IQ^*/Id^*) = kI \cdot IQ^* \qquad (39)$$

More specifically, active component Ip of input current ISSP of first AC-DC power converter SSP is proportional to active current instruction Ip* in FIG. 11, and reactive component IQ is proportional to reactive current instruction IQ* in FIG. 11.

An active power is related to the control operation of voltage crest value Vcap of high-frequency, phase-advanced capacitor CAP. Therefore, active component Ip can be adjusted, as a matter of course.

Reactive power Qs at the receiving end is controlled as follows.

Low-frequency, phase-advanced capacitor CAPS is connected to the receiving end of first power converter SSP and receives advanced current ICAPS. When reactive component IQ of input current ISSP becomes smaller than the above current ICAPS, reactive power detection value Qs becomes negative. If instruction Qs* is set to be zero, deviation $\epsilon Q$ (=Qs*−Qs) becomes positive.

As a result, reactive current instruction IQ* is increased through reactive power control compensation circuit HQ(S), so that DC current instruction Id* is increased and $v\alpha = \cos\alpha p$ is decreased. For this reason, reactive component IQ of actual ISSP is increased, and is balanced when IQ≈ICAPS is established. At this time, active current Ip is not changed.

Conversely, if IQ>ICAPS, Qs becomes positive and deviation $\epsilon Q$ becomes negative value, so that IQ=−kI·IQ* is decreased. Then, control is made to establish IQ=ICAPS.

Therefore, current Is supplied from AC power source SUP is always active current Ip, and the operation of the input power factor=1 can be realized.

As has been described above, if voltage crest value Vcap of high-frequency, phase-advanced capacitor CAP is changed in accordance with rotation speed $\omega r$ of AC motor M, reactive power control at the receiving end can be similarly performed.

An overload operation of an AC motor drive apparatus according to the present invention will now be described.

In the embodiments shown in FIGS. 1 and 10, a rated output of the apparatus is determined by a capacity of high-frequency, phase-advanced capacitor CAP. More specifically, if a current supplied to AC motor M is increased, a delayed reactive power at the input side (at the side of the high-frequency, phase-advanced capacitor) of cycloconverter CC is increased accordingly, and circulating current I0 then becomes zero. Thus, fcap=fc cannot be established, and the apparatus is uncontrollable.

In order to prevent this uncontrollable state, the following method is effective.

Frequencies fc of phase reference signals ea, eb, and ec supplied from external oscillator OSC are changed in accordance with crest values ILm of currents, Iu, Iv, and Iw supplied to AC motor M. More specifically, fc is increased in proportion to ILm. Then, frequencies fcap=fc of voltages Va, Vb, and Vc applied to high-frequency, phase-advanced capacitor CAP are increased, and it is possible to obtain an effect that the capacity of the capacitor is increased. At the same time, the currents are increased, and circulating current I0 of cycloconverter CC is increased accordingly. Therefore, I0 cannot be zero even in the overload operation state, and the uncontrollable state can be avoided. This will be described later in detail with reference to FIG. 17.

In a light-load state, when fc ∝ ILm, an effective capacity of phase-advanced capacitor CAP is decreased, and circulating current I0 is also decreased. More specifically, the circulating current can be prevented from being too increased, a loss can be reduced, and high-efficient operation can be realized.

According to the embodiments described above, the following advantages can be obtained.

(1) A frequency of a current supplied to a motor falls within the range of about 0 to 500 Hz with respect to a power source frequency of 50 Hz. Namely, when a control pulse number (control phase number) of a circulating current type cycloconverter is selected to be large, output frequency f0 can be controlled to exceed input frequency fcap.

In other words, when the frequency of a voltage applied to a phase-advanced capacitor is set to be 500 Hz, the motor can be operated while frequency f0 of a current supplied to the motor falls within the range of about 0 to 500 Hz.

Therefore, the rotation speed of a two-pole AC motor can reach 30,000 rpm, and an ultra-high speed operation can be realized. For this reason, in a blower motor which conventionally has to be accelerated using gears, acceleration gears can be omitted. Thus, operation efficiency can be improved, and the motor can be rendered compact and lightweight.

When the rotation speed is set to be 3,000 rpm, the number of poles of the motor can be set to be 20, and not only torque pulsation can be eliminated but also speed control precision can be improved 10 times or higher the conventional one.

(2) A current supplied to the AC motor is controlled to be a sine wave, and the apparatus having very small torque pulsation can be obtained. At the same time, electromagnetic noise is eliminated, and an adverse influence on a power supply system or other electrical equipment can be reduced.

(3) Power converters are externally-excited converters using natural commutation, and do not require self-extinction elements such as high-power transistors, GTOs, and the like. Therefore, it is possible to realize a system having high reliability and a high overload strength, and to easily increase its capacity.

(4) The input power factor can be maintained to be 1 by reactive power control of the receiving end. A required power source system capacity can be reduced, and variations in power source voltage upon variations in reactive power can be eliminated.

(5) When the first power converter is multiplexed, an input current can approximately have a sine wave, and a harmonic current can be easily reduced.

(6) When a voltage crest value of the phase-advanced capacitor is changed in accordance with the rotation speed of the motor, operation efficiency, particularly in a low-speed operation state, can be improved.

(7) When a frequency of a voltage applied to the phase-advanced capacitor is changed in accordance with a magnitude of a current supplied to the motor, an uncontrollable state can be avoided even in the overload operation state, and efficiency in the light-load operation state can be improved.

Figure 13:
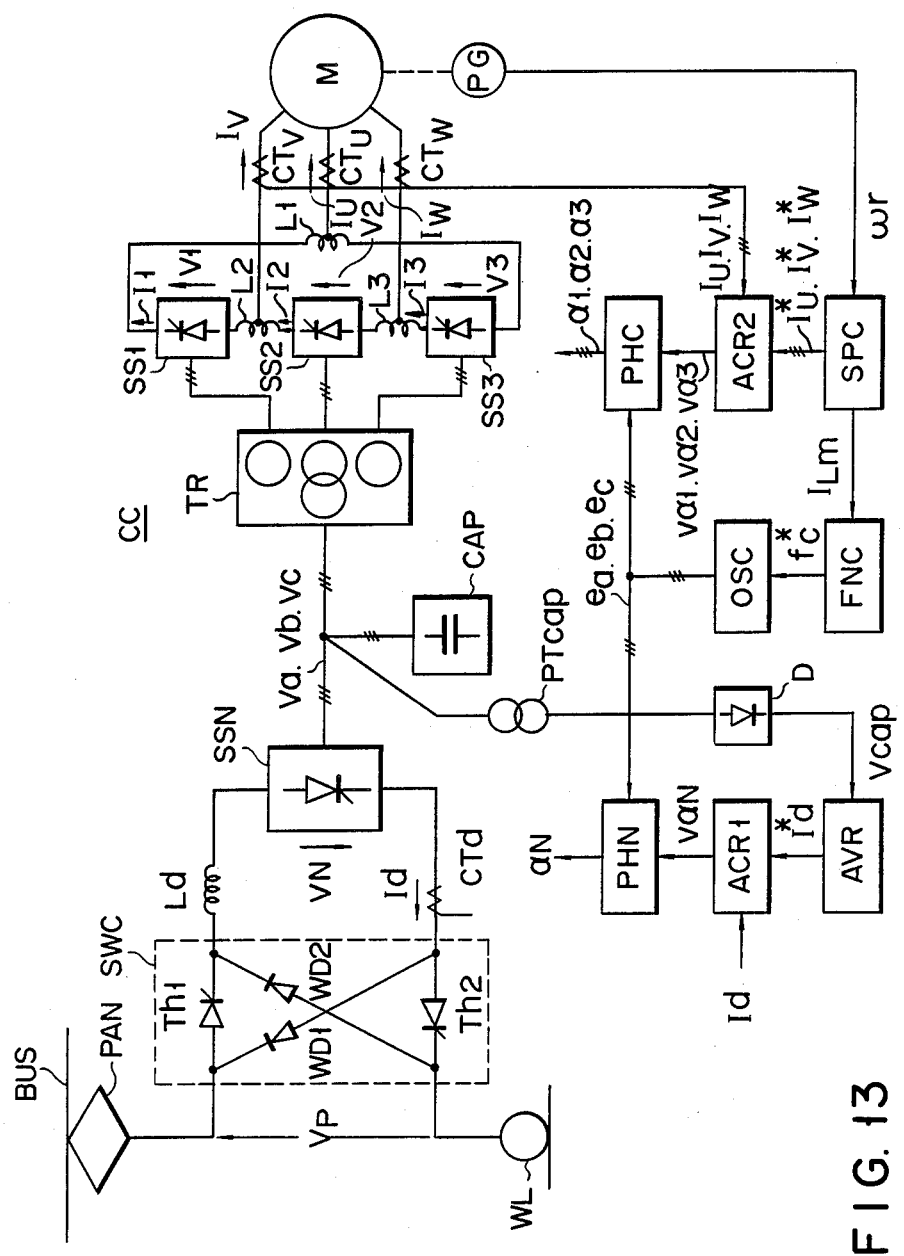
FIG. 13 is a block diagram showing the arrangement of an AC motor drive apparatus according to a third embodiment of the present invention.

FIG. 13 shows the arrangement of still another embodiment of an AC motor drive apparatus according to the present invention.

In FIG. 13, reference symbol BUS denotes DC feeder line; PAN, a pantograph; SWC, a switching circuit; La, a DC reactor; SSN, a DC-AC power converter (externally-excited converter); CAP, a high-frequency, phase-advanced capacitor; CC, a circulating current type cycloconverter; and M, an AC motor (three-phase squirrel-cage induction motor).

Switching circuit SWC comprises thyristor Th1, Th2, and wheeling diode WD1 and WD2, and serves to change a direction of a current supplied from DC feeder line BUS.

Circulating current type cycloconverter CC comprises externally-excited converters SS1 to SS3, DC reactors L1 to L3, and insulating transformer TR, and its output terminal is connected to an armature winding of AC motor M.

Input terminals of DC-AC power converter SSN and cycloconverter CC are connected to high-frequency phase-advanced capacitor CAP.

A control circuit of this embodiment comprises current transformers CTd, CTu, CTv, and CTw, potential transformer PTcap, rotation pulse generator PG, diode D, function generator FNC, three-phase reference voltage generator (external oscillator) OSC, voltage controller AVR, speed controller SPC, current controllers ACR1 and ACR2, and phase controllers PHN and PHC.

DC-AC power converter SSN controls current Id supplied from DC feeder line BUS, so that crest values Vcap of three-phase AC voltages Va, Vb, and Vc applied to high-frequency phase-advanced capacitor CAP are to be constant.

Cycloconverter CC is a delta-connected circulating current type cycloconverter, and supplies three-phase AC power of variable voltage and variable frequency to induction motor M using phase-advanced capacitor CAP as a three-phase voltage source.

For phase control of power converter SSN and cycloconverter CC, three-phase reference voltage signals ea, eb, and ec from external oscillator OSC are used, and frequencies and phases of voltages Va, Vb, and Vc of phase-advanced capacitor CAP coincide with those of reference voltages ea, eb, and ec.

A general operation of the above arrangement is as follows.

A starting operation for establishing voltages Va, Vb, and Vc of phase-advanced capacitor CAP will first be described.

Upon starting, thyristors Th1 and Th2 of switching circuit SWC receive trigger pulses, and are kept ON.

Power converter SSN is phase-controlled based on reference voltages ea, eb, and ec from external oscillator OSC, and initially, its control phase angle αN is set to be 180 degrees.

Thereafter, charging voltage Vcap is set to be an arbitrary value (Va, Vb, and Vc) in the same manner as described above using FIGS. 2 and 4 and equations (1) to (3). As has been described above, frequencies and phases of voltages Va, Vb, and Vc of capacitor CAP coincide with those of phase control reference voltages ea, eb, and ec.

The control operation for the respective components shown in FIG. 13 in the steady state will be described below.

Figure 14:
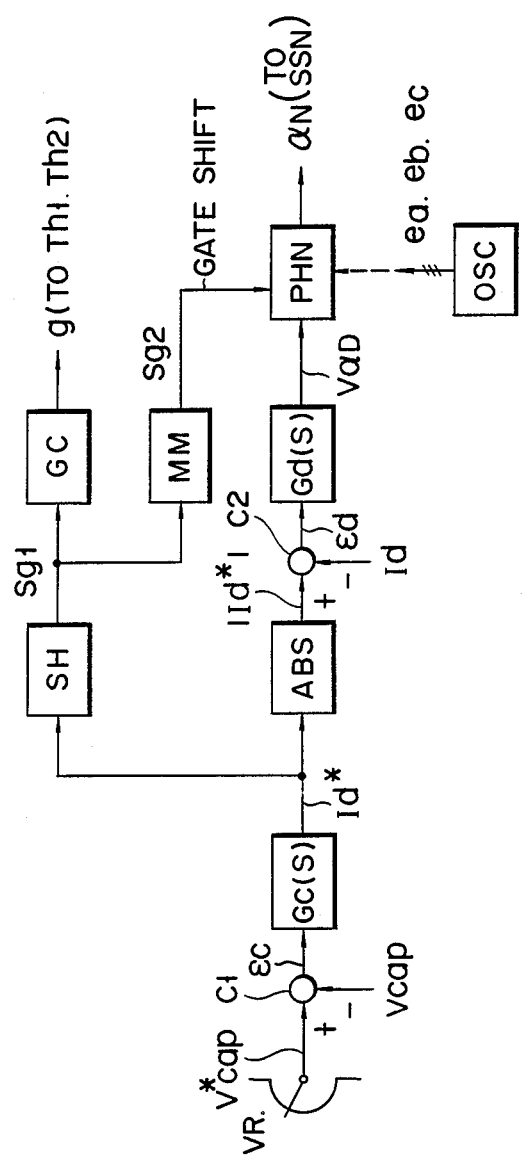
FIG. 14 is a block diagram of a control circuit shown in FIG. 13.

FIG. 14 shows, in detail, a control circuit for DC-AC power converter SSN, and can correspond to the control circuit shown in FIG. 13 as follows.

Voltage controller AVR shown in FIG. 13 is constituted by voltage setting device VR, comparator C1, and voltage control compensation circuit Gc(S) shown in FIG. 14, and outputs DC current instruction Id*.

Current controller ACR1 comprises absolute value circuit ABS, comparator C2, current control compensation circuit Gd(S), Schmitt circuit SH, monostable multivibrator MM, and gate circuit GC.

Phase controller PHN and external oscillator OSC are denoted by the same reference symbols in FIGS. 13 and 14.

Transformer PTcap shown in FIG. 13 detects terminal voltages Va, Vb, and Vc of phase-advanced capacitor CAP, and obtains their crest values Vcap through diode D. Crest values Vcap are input to comparator C1 shown in FIG. 14, and are compared with signal (voltage instruction) Vcap* from voltage setting device VR. Deviation $\epsilon c = Vcap^* - Vcap$ is integrally or linearly amplified by voltage control compensation circuit Gc(S) at the next stage, and is converted to DC current instruction Id*.

However, since a current detected by transformer CTd in FIG. 13 flows in only one direction, DC current instruction Id* is given as $|Id^*|$ through absolute value circuit ABS, in practice.

Switching circuit SWC in FIG. 13 is necessary in regeneration operation. Circuit SWC is controlled by Schmitt circuit SH, monostable multivibrator MM, and gate circuit GC shown in FIG. 14. FIGS. 15A to 15C are timing charts showing their operation states.

More specifically, when instruction Id* becomes positive, output signal Sg1 from Schmitt circuit SH goes to logic "1", so that an ON signal is supplied to thyristors Th1 and TH2 in FIG. 13 through gate circuit GC. As a result, current Id flows through a passage constituted by pantograph PAN, thyristor Th1, DC reactor Ld, power converter SSN, thyristor Th2, wheel WL, and power source (rail) (−).

In contrast to this, if instruction Id* becomes negative, output signal Sg1 from Schmitt circuit SH goes to logic "0", so that an OFF signal is supplied to thyristors Th1 and Th2 in FIG. 13 through gate circuit GC. Then, current Id flows through a passage constituted by power source (−), diode WD2, DC reactor Ld, power converter SSN, diode WD1, and pantograph PAN, and power source (+), thereby regenerating a power.

When instruction Id* is changed from a negative value to a positive value or vise versa, gate shift signal Sg2 is sent to phase controller PHN of power converter SSN through monostable multivibrator MM, within time ΔT in synchronism with the leading or trailing edge of output signal Sg1 from Schmitt circuit SH. In response to this gate shift signal Sg2, output voltage from converter SSN exhibits a maximum value of a voltage in a direction opposite to an arrow in FIG. 13, and perfectly cancels DC current Id to zero. When the gate signals to thyristors Th1 and Th2 of switching circuit SWC are disabled, thyristors Th1 and Th2 are turned off. Gate shift signal Sg2 can be supplied when instruction Id is changed from a positive value to a negative value. In consideration of a case wherein Id is pulsed near zero, gate shift signal Sg2 is preferably supplied when Id* is changed from a negative value to a positive value.

The control operation for DC current Id will now be described.

DC current instruction Id* is input to comparator C2 through absolute value circuit ABS. DC current Id detected by transformer CTd in FIG. 13 is also input to comparator C2, thus obtaining deviation $\epsilon d = |Id^*| - Id$. Deviation $\epsilon d$ is amplified by current control compensation circuit Gd(S), and is supplied to phase controller PHN as input signal VαN expressed by the following equation:

$$V\alpha N = Gd(S) \cdot \epsilon d = Kd \cdot \epsilon d \tag{40}$$

where Kd is a linear constant when current control compensation circuit Gd(S) is a linear amplifier.

DC output voltage VN from power converter SSN is proportional to phase control input signal VαN.

When instruction Id* is a positive value and $|Id^*| > Id$, deviation $\epsilon d$ becomes positive, thus increasing DC voltage VN in a direction indicated by an arrow in FIG. 13. As a result, actual current Id is increased and is controlled to establish $Id \approx |Id^*|$. In contrast to this, if $|Id^*| < Id$, deviation $\epsilon d$ becomes negative, thus decreasing DC voltage VN to a negative value. When VN is negatively increased, $-VN > VP$ is established at a given time, and DC current Id is decreased. Therefore, the current is balanced when $Id = |Id^*|$.

When instruction Id* becomes a negative value, thyristors Th1 and Th2 of switching circuit SWC are turned off so as to set a regeneration mode. In this case, DC current Id is also controlled to be equal to absolute value $|Id^*|$ of its instruction.

The control operation of voltage crest value Vcap of phase-advanced capacitor CAP will be described below.

If Vcap* > Vcap, deviation $\epsilon c = Vcap^* - Vcap$ becomes a positive. Then DC current instruction Id also becomes a positive value and is increased.

Therefore, thyristors Th1 and Th2 of switching circuit SWC are turned on to cause DC current Id to increase in the power generation mode, and active power VP·Id·t is supplied from the power source.

As a result, energy VP·Id·t is supplied from the power source to phase-advanced capacitor CAP, and is charged thereby as $(\frac{1}{2})Ccap \cdot Vcap^2$. Then, voltage Vcap is increased, and is finally balanced when Vcap ≈ Vcap*.

Conversely, if Vcap* < Vcap, deviation $\epsilon c$ becomes negative. Then, DC current instruction Id* becomes a negative value. Therefore, thyristors Th1 and Th2 of switching circuit SWC are turned off to set the power regeneration mode. Then, energy $(\frac{1}{2})Ccap \cdot Vcap^2$ charged on phase-advanced capacitor CAP is regenerated to the power source as VP·Id·t. Therefore, voltage Vcap is decreased and is controlled to attain Vcap = Vcap*.

At this time, circulating current type cycloconverter CC is operated at the same time, so that the frequencies and phases of the voltage of phase-advanced capacitor CAP coincide with those of three-phase reference voltages ea, eb, and ec, as has been described before using equations (4) to (14).

Figure 16:
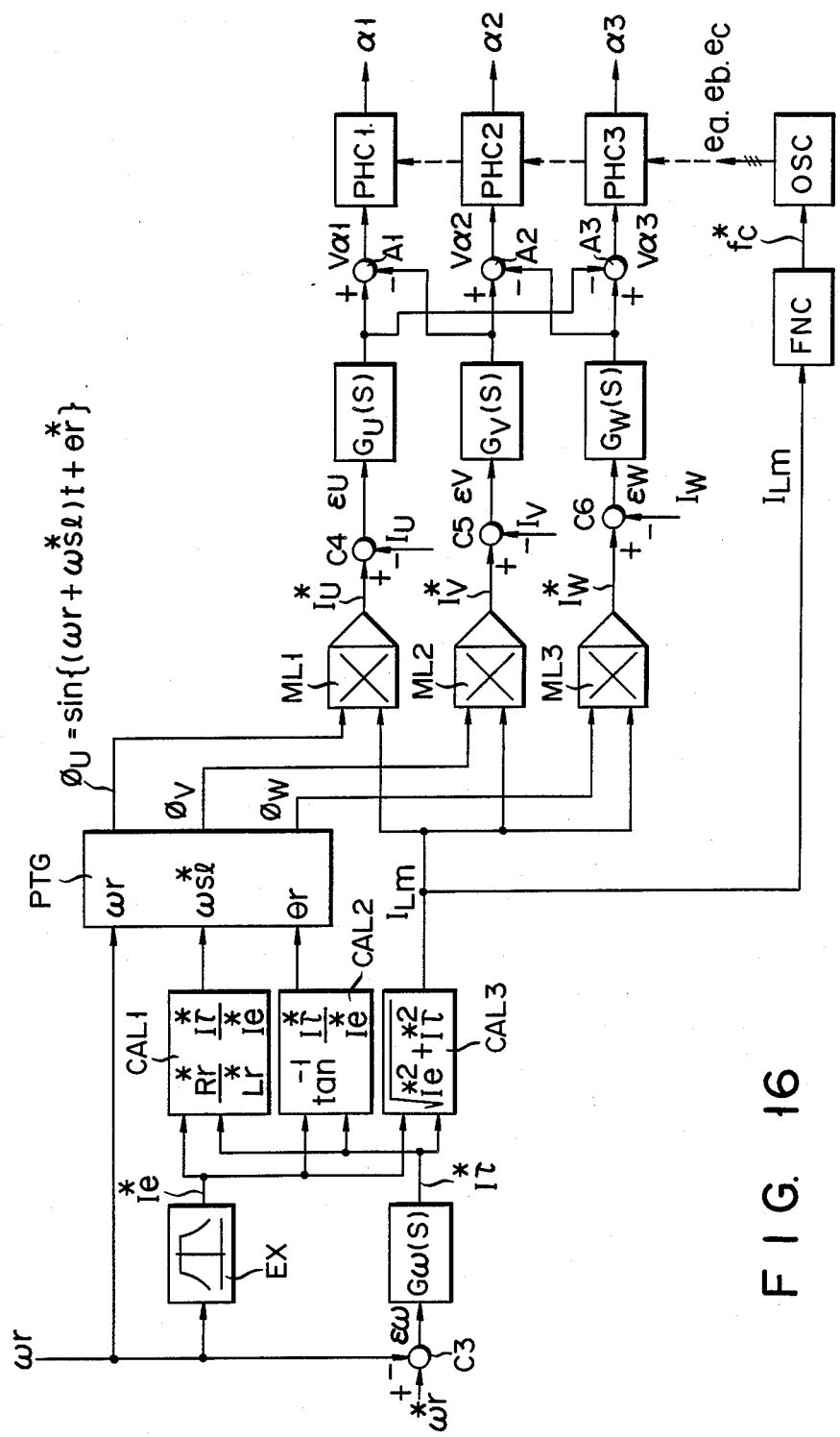
FIG. 16 is a block diagram of another arrangement of the control circuit shown in FIG. 13.

The control operation of output currents Iu, Iv, and Iw by means of cycloconverter CC and the speed control operation of induction motor M are the same as those described before using equations (19) to (31), and a detailed description thereof is omitted. Note that a control circuit for cycloconverter CC is shown in FIG. 16. (The same reference numerals in FIG. 16 denote the same parts as in other figures and a detailed description thereof is omitted.)

Cycloconverter CC and power converter SSN can be regarded as loads generating a king of delayed power with respect to phase-advanced capacitor CAP. Delayed power Qcc is always equal to advanced power Qcap from capacitor CAP, and oscillation frequency fcap represented by equation (11) can be maintained.

A formula for calculating delayed current IQ' of cycloconverter CC and power converter SSN, and for obtaining circulating current I0 flowing through cycloconverter CC, will be described below.

If a DC current is given as Id, a phase control angle of power converter SSN is given as $\alpha N$, output currents from converters SS1 to SS3 of cycloconverter CC are respectively given as I1 to I3, phase control angles at that time are respectively given as $\alpha 1$ to $\alpha 3$, and linear constants are given as k1 and k2. Then, total delayed reactive power IQ' with respect to phase-advanced capacitor CAP is expressed by:

$$IQ' = k1 \cdot Id \cdot \sin N + k2(I1 \cdot \sin\alpha 1 + I2 \cdot \sin\alpha 2 + I3 \cdot \sin\alpha 3) \quad (41)$$

Output currents I1 to I3 from converters SS1 to SS3 of cycloconverters CC are separated into components I1' to I3' depending on load currents Iu to Iw and circulating current I0, and are respectively given as follows:

$$I1 = I1' + I0 \quad (42)$$

$$I2 = I2' + I0 \quad (43)$$

$$I3 = I3' + I0 \quad (44)$$

These equations are substituted in equation (41), and circulating current I0 can be calculated using IQ' = Icap as follows:

$$I0 = \{Icap - k1 \cdot Id \cdot \sin\alpha N - k2(I1' \cdot \sin\alpha 1 + I2' \cdot \sin\alpha 2 + I3' \cdot \sin\alpha 3)/k2(\sin\alpha 1 + \sin\alpha 2 + \sin\alpha 3)\} \quad (45)$$

When load currents Iu, Iv, and Iw are increased, I1', I2', and I3' and DC current Id are decreased and circulating current I0 is gradually decreased. If the loads are further increased, circulating current I0 at last becomes zero. At this time, a condition of fcap = fc can no longer be satisfied. Thus, this is the limit of this apparatus.

When the overload operation is required, an appropriate phase-advanced capacitor CAP must be prepared. In this case, however, circulating current I0 is increased in the light-load operation state, and a transformer loss is increased.

In order to eliminate this drawback, the capacity of phase-advanced capacitor CAP is switched in accordance with a load, or frequency fcap of a voltage applied to phase-advanced capacitor CAP can be changed in accordance with a load.

FIG. 17 shows external characteristics of function generator FNC in FIG. 13, which receives load current crest value ILm and outputs oscillation frequency instruction fc* for external oscillator OSC.

An oscillation frequency is maintained to be fc* = fc1 until load current ILm reaches rated load IL0. Thereafter, upon increase in load, oscillation frequency fc* is increased. Thus, frequency fcap = fc of phase-advanced capacitor CAP is also increased, and advanced current Icap is increased. Therefore, circulating current I0 expressed by equation (45) is not decreased upon increase in load, and is maintained to be constant value I0(min), as shown in FIG. 18. Therefore, the overload operation can be performed, and circulating current I0 in the light-load operation state will not be increased to degrade conversion efficiency.

When AC motor M is operated at low speed, even if a frequency of a voltage applied to phase-advanced capacitor CAP has a lower value, the output current from cycloconverter CC can be controlled to have a sine wave. Therefore, in the low-speed operation state, oscillation frequency instruction fc* is changed in accordance with load current crest value ILm even when it falls within the range below the characteristics indicated by the broken line in FIG. 17, i.e., below rated load IL0. As a result, the circulating current in the light-load operation state changes broken characteristics line I02 in FIG. 18, and efficiency of the apparatus can be improved.

Figure 19:
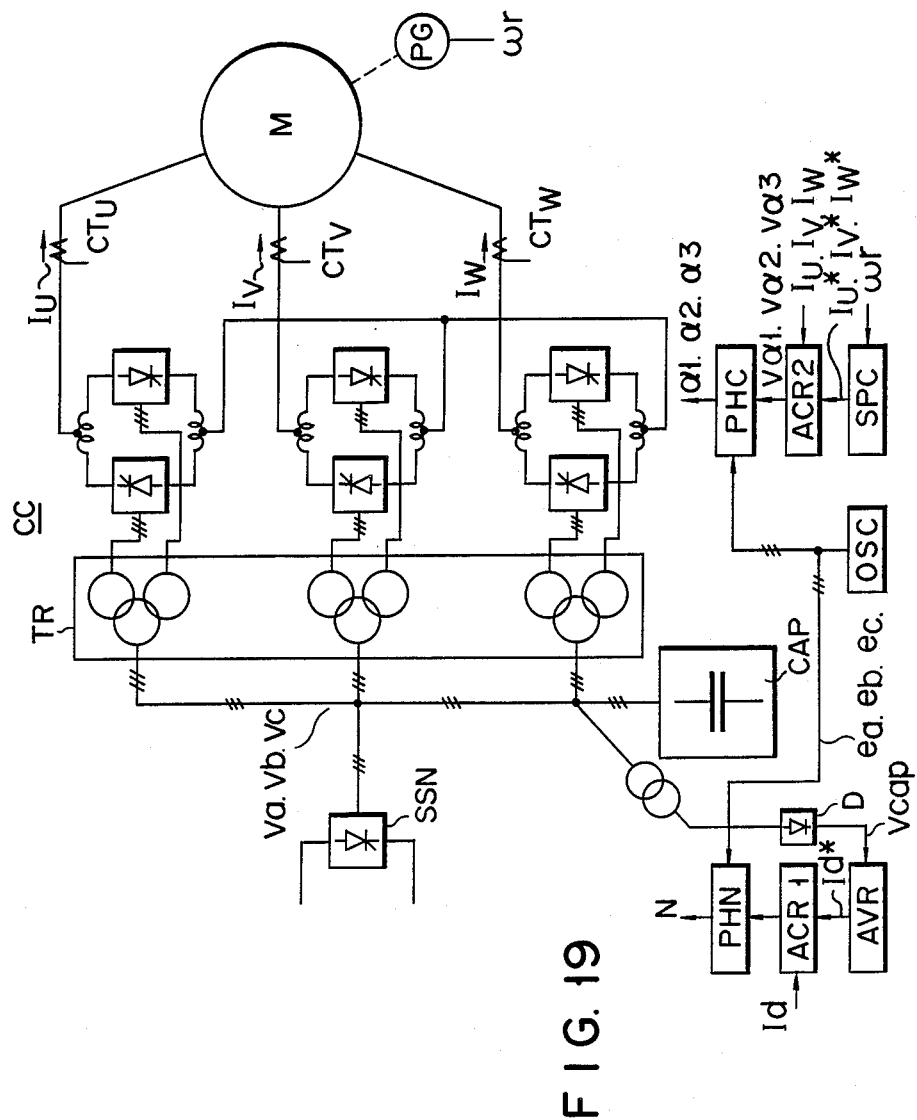
FIG. 19 is a block diagram showing a modification of FIG. 13.

In FIG. 13, the delta-connected cycloconverter has been exemplified as circulating current type cycloconverter CC. As shown in FIG. 19, a circulating current type cycloconverter in which three-phase conventional normal-reverse converters are prepared may be adopted.

In an application wherein power regeneration is not required, switching circuit SWC shown in FIG. 13 can be omitted.

In the AC motor drive described above, the following advantages can be obtained.

(1) All the converters used in this apparatus are naturally commutated. More specifically, the converters are commutated utilizing voltages Va, Vb, and Vc established by phase-advanced capacitor CAP, and self-extinction elements (high-power transistors, GTOs, and the like) used in a conventional inverter can be omitted.

Therefore, although elements used in this apparatus are to be high-speed thyristors, the capacity of the apparatus can be easily increased.

(2) A sine wave current of 0 to several hundred Hz can be supplied from circulating current type cycloconverter CC. Therefore, torque ripples can be reduced while an ultra-high speed motor can be operated.

(3) Switching circuit SWC and externally-excited converter (AC-DC power converter) SSN are only installed between the motor and the DC power source, resulting in a simple arrangement. If power regeneration is not necessary, switching circuit SWC can be omitted.

According to the present invention, a sine wave current of 0 to several hundred Hz can be supplied to an AC motor, the input power factor of the power source can be maintained to be ~1, and high-speed, large-capacity AC variable speed operation can be realized while suppressing harmonic leakage to the power source.

What is claimed is:

1. An AC motor drive apparatus comprising:
a DC/AC power converter having a DC terminal coupled to a DC power source;
a capacitor coupled to an AC terminal of said DC/AC power converter;
a circulating current cycloconverter having an input terminal coupled to said capacitor and an output terminal coupled to an AC motor;
a first control means coupled to said DC/AC power converter, responsive to a predetermined crest value Vcap*, to control said DC/AC power converter such that a crest value Vcap of a voltage on said capacitor substantially matches said predetermined crest value Vcap*; and
a second control means coupled to said cycloconverter, responsive to a current supplied from said cycloconverter to said AC motor and to a reference signal having a given frequency and phase, to control said cycloconverter such that a frequency and phase of the voltage on said capacitor substantially match the frequency and phase of said reference signal, respectively.

2. An apparatus of claim 1, further comprising:
means to regenerate power from said capacitor to a DC power source, said means to regenerate power being coupled to the DC terminal of said DC/AC power converter and to said DC power source.

3. An apparatus of claim 1, further comprising:
reference signal means for providing said reference signal to said first and second control means, wherein both said first and second control means control the voltage on said capacitor so that the frequency and phase of the capacitor voltage respectively match the frequency and phase of said reference signal.

4. An apparatus of claim 3, further comprising:
frequency control means coupled to said reference signal means and being responsive to a value of the current supplied to said AC motor for changing the frequency of said reference signal in proportion to said value of the current supplied to said AC motor.

5. An apparatus of claim 1, further comprising:
speed detector means coupled to said AC motor for generating a rotation speed signal representing a rotation speed of said AC motor; and
current control means coupled to said speed detector means for controlling said cycloconverter so that an excitation current of said AC motor is decreased in response to an increase in the motor rotation speed.

6. An apparatus according to claim 1, further comprising:
speed detector means coupled to said AC motor for generating a rotation speed signal representing a rotation speed of said AC motor; and
voltage control means coupled to said speed detector means for controlling said power converter so that the voltage crest value on said capacitor changes in proportion to the motor rotation speed.

7. An apparatus according to claim 2, further comprising:
speed detector means coupled to said AC motor for generating a rotation speed signal representing a rotation speed of said AC motor, and voltage control means coupled to said speed detector means for controlling said power converter so that the voltage crest value on said capacitor changes in proportion to the motor rotation speed.

8. An apparatus according to claim 3, further comprising:
speed detector means coupled to said AC motor for generating a rotation speed signal representing a rotation speed of said AC motor; and
voltage control means coupled to said speed detector means for controlling said power converter so that the voltage crest value on said capacitor changes in proportion to the motor rotation speed.

9. An apparatus according to claim 4, further comprising:
speed detector means coupled to said AC motor for generating a rotation speed signal representing a rotation speed of said AC motor; and
voltage control means coupled to said speed detector means for controlling said power converter so that the voltage crest value on said capacitor changes in proportion to the motor rotation speed.

10. An apparatus of claim 1, further comprising:
a reactive power source connected to an alternative AC terminal of said DC/AC power converter;
means coupled to the alternative AC terminal of said DC/AC power converter to control AC reactive power of said DC/AC power converter in accordance with a DC voltage and current of said DC/AC power converter.

11. An AC motor drive apparatus comprising:
a first power converter means to convert a first AC current from an AC power source into a DC current with a given DC voltage;
a second power converter means, coupled via a DC reactor to said first power converter means, to convert the DC current into a second AC current;
a reactive power source means coupled to said second power converter means to receive the second AC current and provide reactive power with a given voltage;
a circulating current cycloconverter, coupled to said reactive power source means, to convert the reactive power into a third AC current and to supply the third AC current to an AC motor; and
a control means responsive to a predetermined voltage crest value Vcap* to control said second power converter means such that a crest value Vcap of the voltage of the reactive power from said reactive power source means substantially matches said predetermined voltage crest value Vcap*.

12. An apparatus of claim 11, further comprising:
speed detector means coupled to said AC motor, for generating a rotation speed signal representing a rotation speed of said AC motor; and
means coupled to said speed detector means to convert said rotation speed signal into said predetermined voltage crest value, so that the voltage crest value of said reactive power varies in response to change in the rotation speed of said AC motor.

13. An apparatus of claim 11, further comprising:
means coupled to said cycloconverter to control a frequency of the reactive power voltage of said reactive power source means in response to said third AC current.

14. An apparatus of claim 12, further comprising:
means coupled to said cycloconverter to control a frequency of the reactive power voltage of said reactive power source means in response to said third AC current.

15. An apparatus of claim 11, further comprising:
means coupled to said first power converter means to adjust the DC current and the DC voltage from said first power converter means so that reactive power at the side of said AC power source is made substantially constant.

16. An apparatus of claim 12, further comprising:
means coupled to said first power converter means to adjust the DC current and the DC voltage from said first power converter means so that reactive power at the side of said AC power source is made substantially constant.

17. An apparatus of claim 13, further comprising:
means coupled to said first power converter means to adjust the DC current and the DC voltage from said first power converter means so that reactive power at the side of said AC power source is made substantially constant.

18. An apparatus of claim 11, wherein:
said reactive power source means includes a capacitor which provides a phase-advanced reactive power.

19. An apparatus of claim 12 further comprising:
means coupled to said cycloconverter, responsive to a reference signal having a given frequency and phase, to control said cycloconverter such that a frequency and phase of the voltage of said reactive power source means substantially match the frequency and phase of said reference signal, respectively.

20. An apparatus of claim 12, further comprising:
means coupled to said cycloconverter, responsive to a reference signal having a given frequency and phase, to control said cycloconverter such that a frequency and phase of the voltage of said reactive power source means substantially match the frequency and phase of said reference signal, respectively.

21. An apparatus of claim 13, further comprising:
means coupled to said cycloconverter, responsive to a reference signal having a given frequency and phase, to control said cycloconverter such that a frequency and phase of the voltage of said reactive power source means substantially match the frequency and phase of said reference signal, respectively.

22. An apparatus of claim 14, further comprising:
means coupled to said cycloconverter, responsive to a reference signal having a given frequency and phase, to control said cycloconverter such that a frequency and phase of the voltage of said reactive power source means substantially match the frequency and phase of said reference signal, respectively.

23. An apparatus of claim 15, further comprising:
means coupled to said cycloconverter, responsive to a reference signal having a given frequency and phase, to control said cycloconverter such that a frequency and phase of the voltage of said reactive power source means substantially match the frequency and phase of said reference signal, respectively.

24. An apparatus of claim 16, further comprising:
means coupled to said cycloconverter, responsive to a reference signal having a given frequency and phase, to control said cycloconverter such that a frequency and phase of the voltage of said reactive power source means substantially match the frequency and phase of said reference signal, respectively.

25. An apparatus of claim 17, further comprising:
means coupled to said cycloconverter, responsive to a reference signal having a given frequency and phase, to control said cycloconverter such that a frequency and phase of the voltage of said reactive power source means substantially match the frequency and phase of said reference signal, respectively.

26. An apparatus of claim 18, further comprising:
means coupled to said cycloconverter, responsive to a reference signal having a given frequency and phase, to control said cycloconverter such that a frequency and phase of the voltage of said reactive power source means substantially match the frequency and phase of said reference signal, respectively.

* * * * *